United States Patent
Koga et al.

(10) Patent No.: US 8,861,895 B2
(45) Date of Patent: Oct. 14, 2014

(54) IMAGE PROCESSING APPARATUS

(75) Inventors: Shunichi Koga, Tokyo (JP); Masayuki Tanaka, Tokyo (JP); Masatoshi Okutomi, Tokyo (JP)

(73) Assignees: Olympus Corporation, Shibuya-ku, Tokyo (JP); Tokyo Institute of Technology, Meguro-ku, Tokyo (JP)

(*) Notice: Subject to any disclaimer, the term of this patent is extended or adjusted under 35 U.S.C. 154(b) by 218 days.

(21) Appl. No.: 13/578,537

(22) PCT Filed: Feb. 10, 2011

(86) PCT No.: PCT/JP2011/053434
§ 371 (c)(1),
(2), (4) Date: Oct. 31, 2012

(87) PCT Pub. No.: WO2011/099648
PCT Pub. Date: Aug. 18, 2011

(65) Prior Publication Data
US 2013/0094781 A1    Apr. 18, 2013

(30) Foreign Application Priority Data

Feb. 12, 2010  (JP) .................................. 2010-028847

(51) Int. Cl.
*G06K 9/32* (2006.01)
*H04N 5/232* (2006.01)
*H04N 1/40* (2006.01)
*G06T 3/40* (2006.01)
*H04N 1/409* (2006.01)
*H04N 1/387* (2006.01)

(52) U.S. Cl.
CPC .......... *G06T 3/4007* (2013.01); *H04N 5/23235* (2013.01); *H04N 1/40068* (2013.01); *G06T 3/4053* (2013.01); *H04N 1/4092* (2013.01); *H04N 1/3871* (2013.01)

USPC ............................................ 382/300

(58) Field of Classification Search
USPC ....... 345/3.3; 348/208.13; 358/525; 382/299, 382/300; 386/271; 700/189, 252; 708/290, 708/313, 847
See application file for complete search history.

(56) References Cited

FOREIGN PATENT DOCUMENTS

JP  2006-309649  11/2006
JP  2007-266667  10/2007

(Continued)

OTHER PUBLICATIONS

Gotoh et al., "High Resolution Color Image Reconstruction Using Raw Data of a Single Imaging Chip", vol. 45, No. SIG 8(CVIM 9), Jun. 15, 2004, pp. 15-25.

(Continued)

*Primary Examiner* — Gregory F Cunningham
(74) *Attorney, Agent, or Firm* — Nixon Peabody LLP; Jeffrey L. Costellia

(57) ABSTRACT

An image processing apparatus comprises a processing unit for computing displacement amounts between a basis image and each reference image, a processing unit for generating multiple deformed images based on the displacement amounts, the basis image and multiple reference images, a processing unit for setting a threshold of a parameter, a processing unit for selecting image information from the reference image by threshold, a processing unit for generating composed images and weighted images based on the basis image, the displacement amounts and the image information, a processing unit for generating high-resolution grid images by dividing the composed image by the weighted image, a processing unit for generating simplified interpolation images based on high-resolution grid images, a processing unit for generating an image characteristic amount, a display unit for displaying the image characteristic amount and a control unit that controls the necessary processing as necessary.

32 Claims, 13 Drawing Sheets

(56) References Cited

FOREIGN PATENT DOCUMENTS

| | | | |
|---|---|---|---|
| JP | 2007-305113 | | 11/2007 |
| JP | 2008-077501 | | 4/2008 |
| JP | 2008-092297 | | 4/2008 |
| JP | 02008077501 | * | 4/2008 ................ G06T 3/40 |
| JP | 2008-234130 | | 10/2008 |
| JP | 02008234130 | * | 10/2008 ................ G06T 3/40 |
| JP | 2009-124340 | | 6/2009 |
| JP | 02009124340 | * | 6/2009 ............ H04N 5/225 |
| JP | 2009-188891 | | 8/2009 |
| JP | 2010-108161 | | 5/2010 |
| WO | WO 2004-063991 A1 | | 7/2004 |
| WO | WO 2004-068862 A1 | | 8/2004 |
| WO | WO 2008-102898 A1 | | 8/2008 |
| WO | WO 2009098877 A1 | * | 8/2009 ............ G06T 3/4053 |

OTHER PUBLICATIONS

Shimizu et al., "Precise Simultaneous Estimation of Image Deformation N-Parameter With Its Application on Super-Resolution", vol. 45, No. SIG 13(CVIM 10), Dec. 15, 2004, pp. 83-98.

Toda et al., "Super-Resolution Considering Registration Error", FIT2006.

International Search Report for PCT/JP2011/053434 Dated Mar. 22, 2011.

* cited by examiner (A) FILLING RATE 25%

(B) FILLING RATE 75%

IMAGE PROCESSING APPARATUS

TECHNICAL FIELD

The present invention relates to digital image processing technology, and in particular to an image processing apparatus that is used for low-resolution image set acquisition aid in generating a high-resolution image based on registration of a plurality of low-resolution images.

BACKGROUND ART

Recently, in digital image processing technical field, digital image processing techniques referred to as "super-resolution processing" that generates a high-resolution image by using a plurality of low-resolution images (hereinafter, also simply referred to as "a low-resolution image set") have been developed.

As existing super-resolution processing techniques, for example, as disclosed in Patent Document 1 and Patent Document 2, there is an image processing technique that firstly detects sub-pixel displacement amounts between a plurality of low-resolution images and then generates a high-resolution image by registering and synthesizing these a plurality of low-resolution images on a high-resolution image space based on the detected sub-pixel displacement amounts.

THE LIST OF PRIOR ART DOCUMENTS

Patent Documents

Patent Document 1: Japanese Patent No. 4126378
Patent Document 2: PCT International Publication No. WO2004/068862
Patent Document 3: Japanese Patent Application Laid-Open No. 2007-266667
Patent Document 4: PCT International Publication No. WO2004/063991
Patent Document 5: PCT International Publication No. WO2008/102898

Non-Patent Documents

Non-Patent Document 1:
Toda Masato, Tsukada Masato and Inoue Akira, "Super-Resolution Considering Registration Error", FIT (Forum on Information Technology) 2006, 1-027, pp. 63-64, 2006

SUMMARY OF THE INVENTION

Problems to be Solved by the Invention

As described above, in generating a high-resolution image by using a plurality of low-resolution images and by using the above-described existing super-resolution processing techniques, it is necessary to register these a plurality of low-resolution images on the high-resolution image space based on the displacement amounts between a plurality of low-resolution images.

In this case, due to influences of motions of objects, the number of low-resolution images to be used, motion estimation processing, pixel selection processing and so on, pixel density on the high-resolution image space after registering a plurality of low-resolution images becomes uneven. With respect to image data having such an uneven pixel density, interpolation processing is performed.

However, since the interpolation processing fills lacking pixels on the high-resolution image space with estimated values, high-resolutionization based on the interpolation processing is not always correct.

Therefore, in generating a high-resolution image by using a plurality of low-resolution images, that is to say, in generating a high-resolution image by the super-resolution processing based on a plurality of low-resolution images, it is preferred to acquire a plurality of low-resolution images (a low-resolution image set) so that the pixel density on the high-resolution image space after registering a plurality of low-resolution images becomes nearly equable.

In this way, to generate a high-resolution image by the super-resolution processing, although users have to acquire a plurality of low-resolution images having sub-pixel displacements, a problem that users cannot know whether optimal low-resolution images for the super-resolution processing are sufficiently obtained or not, exists.

On the other hand, in Patent Document 3, "mobile device with camera, method for controlling the same and method for photographing aid" that provides user's camera operation aid so as to become a proper amount of shooting, in generating a synthesized image by using images taken by users and based on a mosaicing processing or the super-resolution processing, is disclosed.

In the Patent Document 3, although providing user's camera operation aid by showing users the proper amount of shooting, it does not show users a proper sub-pixel amount of shooting.

The present invention has been developed in view of the above-described circumstances, and an object of the present invention is to provide an image processing apparatus for aiding that users acquire an optimal low-resolution image set for super-resolution processing in generating a high-resolution image by using a plurality of low-resolution images and by means of the super-resolution processing.

Means for Solving the Problems

The present invention relates to an image processing apparatus for aiding that a user acquires an optimal low-resolution image set for a super-resolution processing in generating a high-resolution image by using a plurality of low-resolution images and by means of said super-resolution processing. The above-described object of the present invention is achieved by that comprising: an image input unit for inputting said plurality of low-resolution images; a basis image selecting unit for selecting a basis image from said plurality of low-resolution images that are inputted; a reference image selecting unit for selecting a plurality of reference images to be used in said super-resolution processing from said plurality of low-resolution images that are inputted; a displacement amount computing unit for computing a displacement amount for performing registration on a high-resolution image space between said basis image and said each reference image; a deformed image generating unit for generating a plurality of deformed images based on said displacement amounts, said basis image and said plurality of reference image; a composed image and weighted image generating unit for generating composed images and weighted images based on said displacement amounts, said basis image and information about said reference images and said deformed images; a high-resolution grid image generating unit for generating high-resolution grid images by dividing said composed image by said weighted image; an image characteristic amount computing unit for computing image characteristic amounts; and an image characteristic amount display unit for displaying said image characteristic amounts. Or, it is also possible that said plurality of low-resolution images are images that lack at least one or more kinds of color channel information in pixel information.

Further, the above-described object of the present invention is more effectively achieved by that said image characteristic amount computing unit comprises a filling rate computing unit for computing a filling rate of said high-resolution grid image that represents a ratio of undefined pixels of said high-resolution grid image with respect to number of pixels on said high-resolution image space. Or, it is also possible that said image characteristic amount is a filling rate computed with respect to every small region obtained by region-dividing said high-resolution grid image. Or, it is also possible that said image characteristic amount is a ratio of small regions having a filling rate more than or equal to a given threshold with respect to total number of small regions obtained by region-dividing said high-resolution grid image.

Moreover, the above-described object of the present invention is more effectively achieved by that said image characteristic amount computing unit comprises a high-frequency component computing unit for computing a high-frequency component with respect to said high-resolution grid image. Or, it is also possible that said image characteristic amount is a relative high-frequency component of said high-resolution grid image that represents a ratio of a high-frequency component of said high-resolution grid image to a high-frequency component of said basis image. Or, it is more effectively achieved by that said image characteristic amount computing unit comprises an edge amount computing unit for computing an edge amount with respect to said high-resolution grid image. Or, it is also possible that said image characteristic amount is a relative edge amount of said high-resolution grid image that represents a ratio of an edge amount of said high-resolution grid image to an edge amount of said basis image.

Furthermore, the above-described object of the present invention is more effectively achieved by that said image characteristic amount computing unit comprises an interpolation processing unit for performing an interpolation processing of missing pixels with respect to said high-resolution grid image and generating an interpolation image. Or, it is more effectively achieved by that said image characteristic amount computing unit comprises a color specification conversion processing unit for performing a color specification conversion processing with respect to said basis image and said interpolation image, and generating a color specification conversion basis image and a color specification conversion interpolation image. Or, it is more effectively achieved by that said image characteristic amount computing unit comprises a high-frequency component computing unit for computing a high-frequency component with respect to said interpolation image or said color specification conversion interpolation image. Or, it is also possible that said image characteristic amount is a relative high-frequency component of said interpolation image that represents a ratio of a high-frequency component of said interpolation image to a high-frequency component of said basis image. Or, it is also possible that said image characteristic amount is a relative high-frequency component of said color specification conversion interpolation image that represents a ratio of a high-frequency component of said color specification conversion interpolation image to a high-frequency component of said color specification conversion basis image. Or, it is more effectively achieved by that said image characteristic amount computing unit comprises an edge amount computing unit for computing an edge amount with respect to said interpolation image or said color specification conversion interpolation image. Or, it is also possible that said image characteristic amount is a relative edge amount of said interpolation image that represents a ratio of an edge amount of said interpolation image to an edge amount of said basis image. Or, it is also possible that said image characteristic amount is a relative edge amount of said color specification conversion interpolation image that represents a ratio of an edge amount of said color specification conversion interpolation image to an edge amount of said color specification conversion basis image. Or, it is more effectively achieved by that said image characteristic amount computing unit comprises a color difference computing unit for computing color differences with respect to said basis image and said interpolation image. Or, it is also possible that said image characteristic amount is a relative color difference of said interpolation image that represents a ratio of a color difference of said interpolation image to a color difference of said basis image. Or, it is more effectively achieved by that said image characteristic amount computing unit comprises a color difference computing unit for computing color differences with respect to said color specification conversion basis image and said color specification conversion interpolation image. Or, it is also possible that said image characteristic amount is a relative color difference of said color specification conversion interpolation image that represents a ratio of a color difference of said color specification conversion interpolation image to a color difference of said color specification conversion basis image. Or, it is more effectively achieved by that said image characteristic amount computing unit comprises a color saturation computing unit for computing color saturations with respect to said basis image and said interpolation image. Or, it is also possible that said image characteristic amount is a relative color saturation of said interpolation image that represents a ratio of a color saturation of said interpolation image to a color saturation of said basis image. Or, it is more effectively achieved by that said image characteristic amount computing unit comprises a color saturation computing unit for computing color saturations with respect to said color specification conversion basis image and said color specification conversion interpolation image. Or, it is also possible that said image characteristic amount is a relative color saturation of said color specification conversion interpolation image that represents a ratio of a color saturation of said color specification conversion interpolation image to a color saturation of said color specification conversion basis image. Or, it is also possible that said image characteristic amount is each similarity between said plurality of deformed images and said basis image. Or, it is also possible that said image characteristic amount is a similarity between said basis image and each deformed image of every small region obtained by region-dividing said plurality of deformed images and said basis image. Or, it is also possible that said image characteristic amount is a ratio of small regions having a similarity more than or equal to a given threshold with respect to total number of small regions obtained by region-dividing said deformed image. Or, it is more effectively achieved by that said image characteristic amount display unit displays a transition of said image characteristic amount.

Further, the above-described object of the present invention is more effectively achieved by that said image processing apparatus further comprises a parameter setting unit for setting a threshold of a parameter becoming a basis for selecting image information of said reference image; and an external I/F control unit for making a change in said threshold of said parameter of said parameter setting unit in accordance with said user's visual recognition result of said image characteristic amount displayed in said image characteristic amount display unit. Or, it is more effectively achieved by that said image processing apparatus further comprises an external I/F control unit for making a change in number of said plurality of reference images in accordance with said user's visual recognition result of said image characteristic amount displayed in said image characteristic amount display unit. Or, it is more effectively achieved by that said image processing apparatus further comprises an external I/F control unit for making a change in number of said plurality of low-resolution images that are inputted into said image input unit in accordance with said user's visual recognition result of said image characteristic amount displayed in said image characteristic amount display unit. Or, it is more effectively achieved by that said image processing apparatus further comprises an external I/F control unit for performing selection of said reference images in accordance with said user's visual recognition result of said image characteristic amount displayed in said image characteristic amount display unit.

Effects of the Invention

In the present invention, in generating a high-resolution image by using a plurality of low-resolution images and by means of the super-resolution processing, by showing users image characteristic amounts (a filling rate, a high-frequency component, an edge amount, a color saturation and a color difference) computed based on the high-resolution grid image and the simplified interpolation image that are generated on the basis of the basis image, the composed image and weighted image that are generated during the super-resolution processing, it becomes possible to provide user aid (low-resolution image set acquisition aid) so that users can acquire an optimal low-resolution image set for the super-resolution processing.

MODE FOR CARRYING OUT THE INVENTION

The present invention relates to an image processing apparatus for aiding that users acquire an optimal low-resolution image set for super-resolution processing in generating a high-resolution image by using a plurality of low-resolution images and by means of the super-resolution processing.

Hereinafter, embodiments of the present invention will be described in detail with reference to the accompanying drawings.

Figure 1:
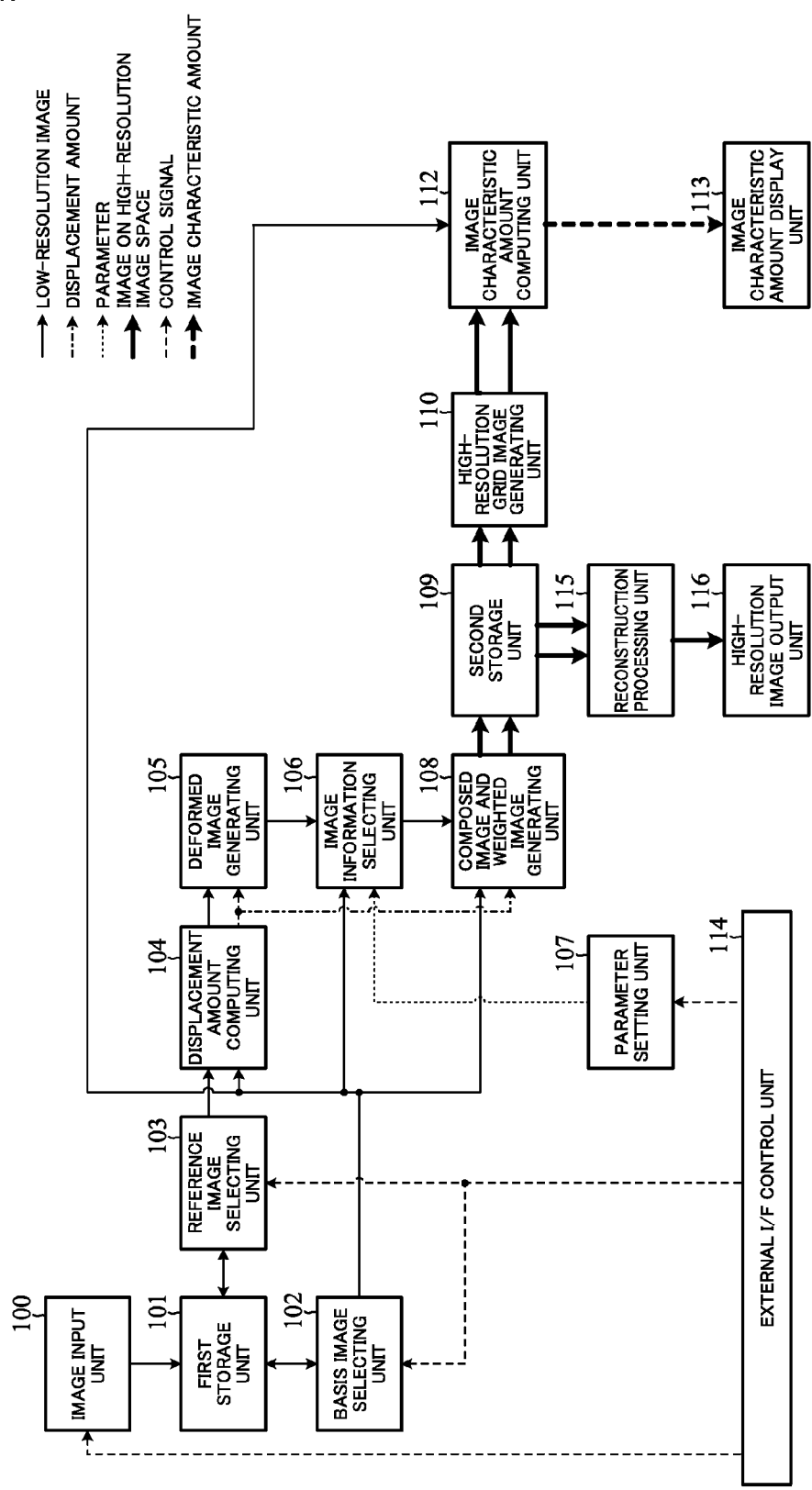
FIG. 1 is a configuration block diagram showing a first embodiment of an image processing apparatus according to the present invention.
Figure 2:
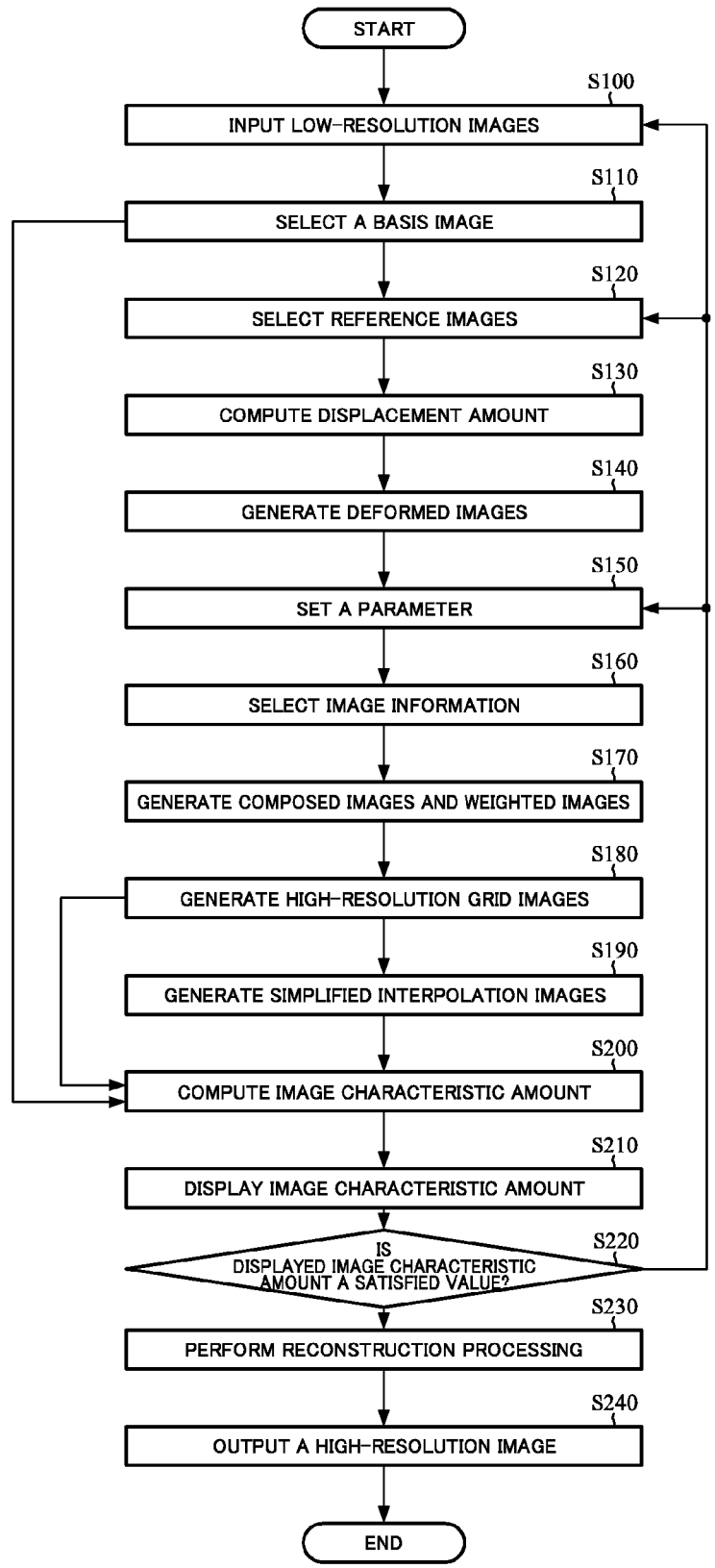
FIG. 2 is a flow chart showing processing flow of the image processing apparatus according to the first embodiment of the present invention shown in FIG. 1.

FIG. 1 is a configuration block diagram showing a first embodiment of an image processing apparatus according to the present invention (hereinafter, also simply referred to as "an image processing apparatus 1 according to the present invention" or "an image processing apparatus 1"). Further, FIG. 2 is a flow chart showing processing flow of the image processing apparatus 1 according to the present invention shown in FIG. 1. Hereinafter, the image processing apparatus 1 will be described in detail with reference to FIG. 1 and FIG. 2.

As shown in FIG. 1, the image processing apparatus 1 comprises an image input unit 100, a first storage unit 101, a basis image selecting unit 102, a reference image selecting unit 103, a displacement amount computing unit 104, a deformed image generating unit 105, an image information selecting unit 106, a parameter setting unit 107, a composed image and weighted image generating unit 108, a second storage unit 109, a high-resolution grid image generating unit 110, an image characteristic amount computing unit 112, an image characteristic amount display unit 113, an external I/F control unit 114, a reconstruction processing unit 115 and a high-resolution image output unit 116. Further, in the image processing apparatus 1, the external I/F control unit 114 can control processing in the image input unit 100, the basis image selecting unit 102, the reference image selecting unit 103 and the parameter setting unit 107 by respectively transmitting control signals to the image input unit 100, the basis image selecting unit 102, the reference image selecting unit 103 and the parameter setting unit 107 as necessary.

As shown in FIG. 1, in the image input unit 100, at first, the image input unit 100 inputs a plurality of low-resolution images (see step S100 of FIG. 2). And then, a plurality of low-resolution images inputted into the image input unit 100, are stored in the first storage unit 101. Further, the image input unit 100 can input a given number of low-resolution images selected by users through the external I/F control unit 114 according to selections of users.

Here, in the present invention, as a plurality of low-resolution images inputted into the image input unit 100, it is possible to use images obtained by a three-chip solid-state color imaging device, and it is also possible to use images that are obtained by a single-chip solid-state color imaging device using a color filter and lack at least one or more kinds of color channel information in pixel information. As the color filter, for example, it is possible to use a Bayer color filter.

Next, the basis image selecting unit 102 selects a basis image from a plurality of low-resolution images stored in the first storage unit 101 (see step S110 of FIG. 2). In the present invention, "the basis image" is a low-resolution image high-resolutionized and is also an image becoming a basis in computing displacememt amounts in the displacement amount computing unit 104.

In the present invention, the basis image selecting unit 102 selects one low-resolution image that users want to high-resolutionize as the basis image through the external I/F control unit 114. Further, in the present invention, it is also possible that the basis image selecting unit 102 selects one basis image from a plurality of low-resolution images stored in the first storage unit 101 based on a given evaluation basis. As the given evaluation basis, for example, it is possible to use a correlation between images and a focused state.

Next, the reference image selecting unit 103 selects a plurality of reference images used in a high-resolutionization processing (a super-resolution processing) from a plurality of low-resolution images stored in the first storage unit 101 (see step S120 of FIG. 2).

That is to say, the reference image selecting unit 103 selects a given number of reference images from a plurality of low-resolution images stored in the first storage unit 101, and further, users can arbitrarily set the said given number through the external I/F control unit 114.

Next, the displacement amount computing unit 104 respectively computes a position relation between the basis image selected by the basis image selecting unit 102 and each reference image selected by the reference image selecting unit 103 by performing a displacement amount computation processing (see step S130 of FIG. 2). Here, the position relation computed by the displacement amount computing unit 104, becomes a displacement amount for performing registration on a high-resolution image space.

In the present invention, in order to perform the registration on the high-resolution image space, it is necessary to compute a sub-pixel displacement amount between the basis image and each reference image. As concrete examples of the displacement amount computation processing performed in the displacement amount computing unit 104, for example, it is possible to preliminarily enlarge the basis image and each reference image by an interpolation processing (for example, an interpolation processing base on a bicubic method) and then compute the sub-pixel displacement amount between the enlarged basis image and enlarged each reference image by a block matching method, and it is also possible to compute by an existing technique disclosed in Patent Document 4.

Moreover, in the displacement amount computing unit 104, in computing the sub-pixel displacement amount from the low-resolution image, it is necessary to convert the computed sub-pixel displacement amount to a sub-pixel displacement amount on the high-resolution image space.

In other words, the displacement amount computed by the displacement amount computing unit 104 becomes the sub-pixel displacement amount on the high-resolution image space.

Next, the deformed image generating unit 105 generates a plurality of deformed images by respectively performing an image deformation with respect to each reference image based on the displacement amount computed by the displacement amount computing unit 104 by performing a deformed image generation processing (see step S140 of FIG. 2) so as to match with the basis image.

Moreover, in the deformed image generating unit 105, in order to generate the deformed image, it is also possible to generate a plurality of deformed images by performing the image deformation with respect to the basis image based on the displacement amount computed by the displacement amount computing unit 104 so as to respectively match with each reference image.

Next, the parameter setting unit 107 sets a threshold of a parameter for determining whether utilizing the pixel of the reference image in the super-resolution processing or not by performing a parameter setting processing (see step S150 of FIG. 2). As the said parameter, it is possible to use a similarity or dissimilarity between images. Further, users can arbitrarily set the threshold of the said parameter through the external I/F control unit 114.

Here, concrete examples of the parameter used in the present invention will be described.

As an example, setting an SSD (Sum of Squared Difference) obtained with respect to pixels that the position of the basis image corresponds to the position of the deformed image (for example, the reference image performed by the image deformation) as the parameter.

As the parameter, in the case of using the SSD (Sum of Squared Difference) obtained with respect to each pixel, the parameter setting unit 107 sets a threshold of the SSD between the basis image and the deformed image that is obtained with respect to each pixel. In an image information selection processing performed by the image information selecting unit 106 described below, if the SSD between the basis image and the deformed image that is obtained with respect to each pixel is less than or equal to the threshold that is set, selecting the pixel of the reference image as a pixel utilized in the super-resolution processing.

Of course, in the present invention, the parameter is not limited to the SSD between the basis image and the deformed image that is obtained with respect to each pixel, and it is also possible to use an SSD obtained with respect to each frame or each region that the position of the basis image corresponds to the position of the deformed image as the parameter.

Further, in the present invention, not only the SSD but also a known similarity or dissimilarity such as an SAD (Sum of absolute Difference) or an NCC (Normalized Cross-Correlation) can be used as the parameter.

In the present invention, in the case of setting a luminance value of the basis image at a position $(i, j)$ as $T(i, j)$ and setting a luminance value of the deformed image (for example, the reference image that the image deformation is performed so as to match with the basis image) as $I(i, j)$, the SSD, the SAD and the NCC between the basis image having a region of M pixels×N pixels and the deformed image can be obtained based on the following Expression 1, Expression 2 and Expression 3, respectively.

$$SSD = \sum_{j=0}^{N-1} \sum_{i=0}^{M-1} (I(i, j) - T(i, j))^2 \qquad \text{(Expression 1)}$$

$$SAD = \sum_{j=0}^{N-1} \sum_{i=0}^{M-1} |I(i, j) - T(i, j)| \qquad \text{(Expression 2)}$$

$$NCC = \frac{\sum_{j=0}^{N-1}\sum_{i=0}^{M-1} I(i,j)T(i,j)}{\sqrt{\sum_{j=0}^{N-1}\sum_{i=0}^{M-1} I(i,j)^2 \times \sum_{j=0}^{N-1}\sum_{i=0}^{M-1} T(i,j)^2}} \quad \text{(Expression 3)}$$

The more the SSD and the SAD are small values, the more that image information becomes image information that is desirable for the super-resolution processing. Further, The more the NCC is a large value, the more that image information becomes image information that is desirable for the super-resolution processing.

That is to say, in the present invention, in the case of using the SSD between the basis image and the deformed image as the parameter, in the image information selection processing performed by the image information selecting unit 106 described below, if the SSD between the basis image and the deformed image that is obtained with respect to each pixel is less than or equal to the threshold of the SSD that is set by the parameter setting unit 107, selecting the pixel of the reference image as a pixel utilized in the super-resolution processing.

Further, in the present invention, in the case of using the SAD between the basis image and the deformed image as the parameter, in the image information selection processing performed by the image information selecting unit 106 described below, if the SAD between the basis image and the deformed image that is obtained with respect to each pixel is less than or equal to the threshold of the SAD that is set by the parameter setting unit 107, selecting the pixel of the reference image as a pixel utilized in the super-resolution processing.

And then, in the present invention, in the case of using the NCC between the basis image and the deformed image as the parameter, in the image information selection processing performed by the image information selecting unit 106 described below, if the NCC between the basis image and the deformed image that is obtained with respect to each pixel is more than or equal to the threshold of the NCC that is set by the parameter setting unit 107, selecting the pixel of the reference image as a pixel utilized in the super-resolution processing.

Moreover, in the present invention, not only the similarity or dissimilarity between images but also for example, a basis based on a deformed amount of the above-described I(i, j) disclosed in known background arts such as Non-Patent Document 1 and Patent Document 5 can be used as the parameter.

Next, the image information selecting unit 106 selects image information utilized in the super-resolution processing from a plurality of reference images based on the threshold of the parameter that is set by the parameter setting unit 107, the basis image selected by the basis image selecting unit 102 and a plurality of deformed images generated by the deformed image generating unit 105 by performing an image information selection processing (see step S160 of FIG. 2).

Here, one concrete example of the image information selection processing performed by the image information selecting unit 106 in the case of using the SSD between the basis image and the deformed image as the parameter, will be described.

The image information selecting unit 106 firstly computes the SSD between the basis image and the deformed image for each pixel, and then selects the image information (a plurality of pixels) utilized in the super-resolution processing from a plurality of reference images so that if the computed SSD is less than or equal to the threshold of the SSD that is set by the parameter setting unit 107, selecting the pixel of the reference image existing at that pixel position as a pixel utilized in the super-resolution processing, and on the other hand, if the computed SSD is more than the threshold of the SSD that is set by the parameter setting unit 107, not selecting the pixel of the reference image existing at that pixel position as a pixel utilized in the super-resolution processing.

In other words, as image information utilized in the super-resolution processing, the image information selected by the image information selecting unit 106 is image formation that is comprised of a plurality of pixels selected from a plurality of reference images. That is to say, the image information selected by the image information selecting unit 106 is a plurality of pixels selected from a plurality of reference images.

Next, the composed image and weighted image generating unit 108 generates composed images and weighted images based on the basis image selected by the basis image selecting unit 102, the displacement amount computed by the displacement amount computing unit 104 and the image information selected by the image information selecting unit 106 (see step S170 of FIG. 2). The composed images and the weighted images that are generated by the composed image and weighted image generating unit 108, are stored in the second storage unit.

Figure 3:
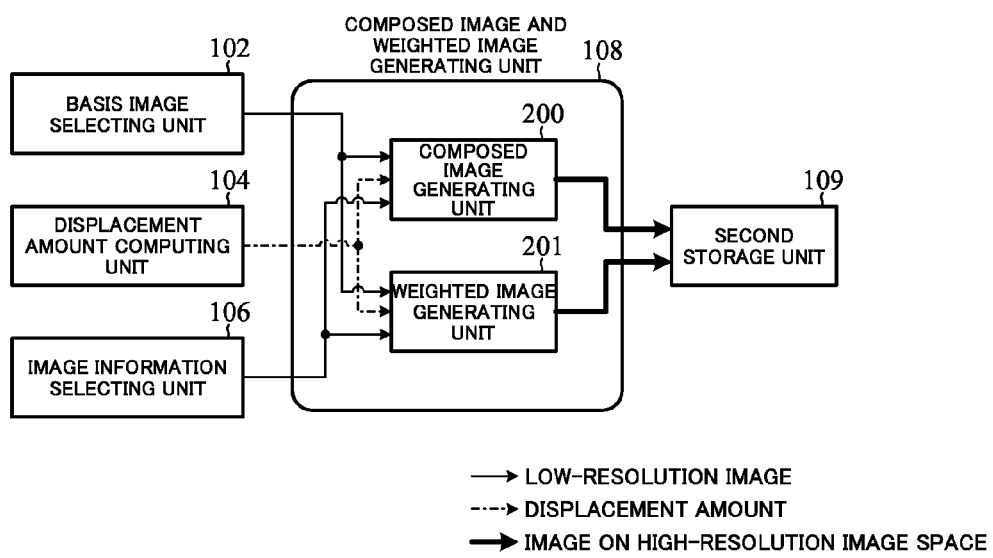
FIG. 3 is a configuration block diagram showing an embodiment of a composed image and weighted image generating unit of the image processing apparatus according to the present invention.

Here, an embodiment of the composed image and weighted image generating unit 108 will be described in detail. FIG. 3 is a configuration block diagram showing the embodiment of the composed image and weighted image generating unit (the composed image and weighted image generating unit 108) of the image processing apparatus according to the present invention.

As shown in FIG. 3, the composed image and weighted image generating unit 108 comprises a composed image generating unit 200 for generating the composed image and a weighted image generating unit 201 for generating the weighted image.

In the composed image and weighted image generating unit 108, at first, the composed image generating unit 200 generates the composed image by arranging each pixel of the selected image information on the high-resolution image space based on the basis image selected by the basis image selecting unit 102, the displacement amount computed by the displacement amount computing unit 104 (i.e. the sub-pixel displacement amount on the high-resolution image space) and the image information selected from a plurality of reference images by the image information selecting unit 106. In addition, the number of pixels of the composed image is equal to the number of pixels of the high-resolution image space.

Next, the weighted image generating unit 201 generates the weighted image by weighting each pixel of the selected image information and arranging weights corresponding to each pixel on the high-resolution image space based on the basis image selected by the basis image selecting unit 102, the displacement amount computed by the displacement amount computing unit 104 and the image information selected from a plurality of reference images by the image information selecting unit 106. In addition, the number of pixels of the weighted image is equal to the number of pixels of the high-resolution image space.

With respect to weighting each pixel of the selected image information that is performed in the weighted image generating unit 201, it is possible to determine a reliability of the displacement amount by evaluating the correlation of pixels corresponding to each other once again based on the displacement amount computed by the displacement amount computing unit 104 for every pixel and set a weight of 0~1 in accordance with the determined reliability, and further it is also possible to weight each pixel of the selected image information in accordance with an imaging time from the basis image becoming the basis of the registration.

Moreover, in the composed image generating unit 200, in arranging pixels of the selected image information on the high-resolution image space, in the case that other pixels are already arranged at the same position (the same pixel position) on the high-resolution image space, accumulatively adding the pixel value of the said pixel to pixel values of those pixels.

Further, in the weighted image generating unit 201, in arranging weights corresponding to pixels of the selected image information on the high-resolution image space, in the case that weights corresponding to other pixels are already arranged at the same position (the same pixel position) on the high-resolution image space, accumulatively adding the weight corresponding to the said pixel to weights corresponding to those pixels.

In this way, the composed images and the weighted images that are generated in the composed image and weighted image generating unit 108, become unequal images that defined pixels that the pixel value is determined and undefined pixels that the pixel value is not determined mix from a relation among the number of low-resolution images used, the number of pixels of the high-resolution image space that the registration is performed, weights corresponding to pixels of the selected image information, motions of objects and so on.

In the above-described embodiment of the composed image and weighted image generating unit 108, in generating the composed images and the weighted images, although accumulatively adding the pixel value and the weight respectively, the composed image and weighted image generating unit of the image processing apparatus according to the present invention is not limited to the above-described embodiment, for example, in arranging the pixel value and the weight on the high-resolution image space, in the case that the pixel value or the weight is already arranged at the same pixel position, it is also possible to generate the composed images and the weighted images without accumulatively adding and by abandoning the said pixel value and the said weight.

Figure 4:
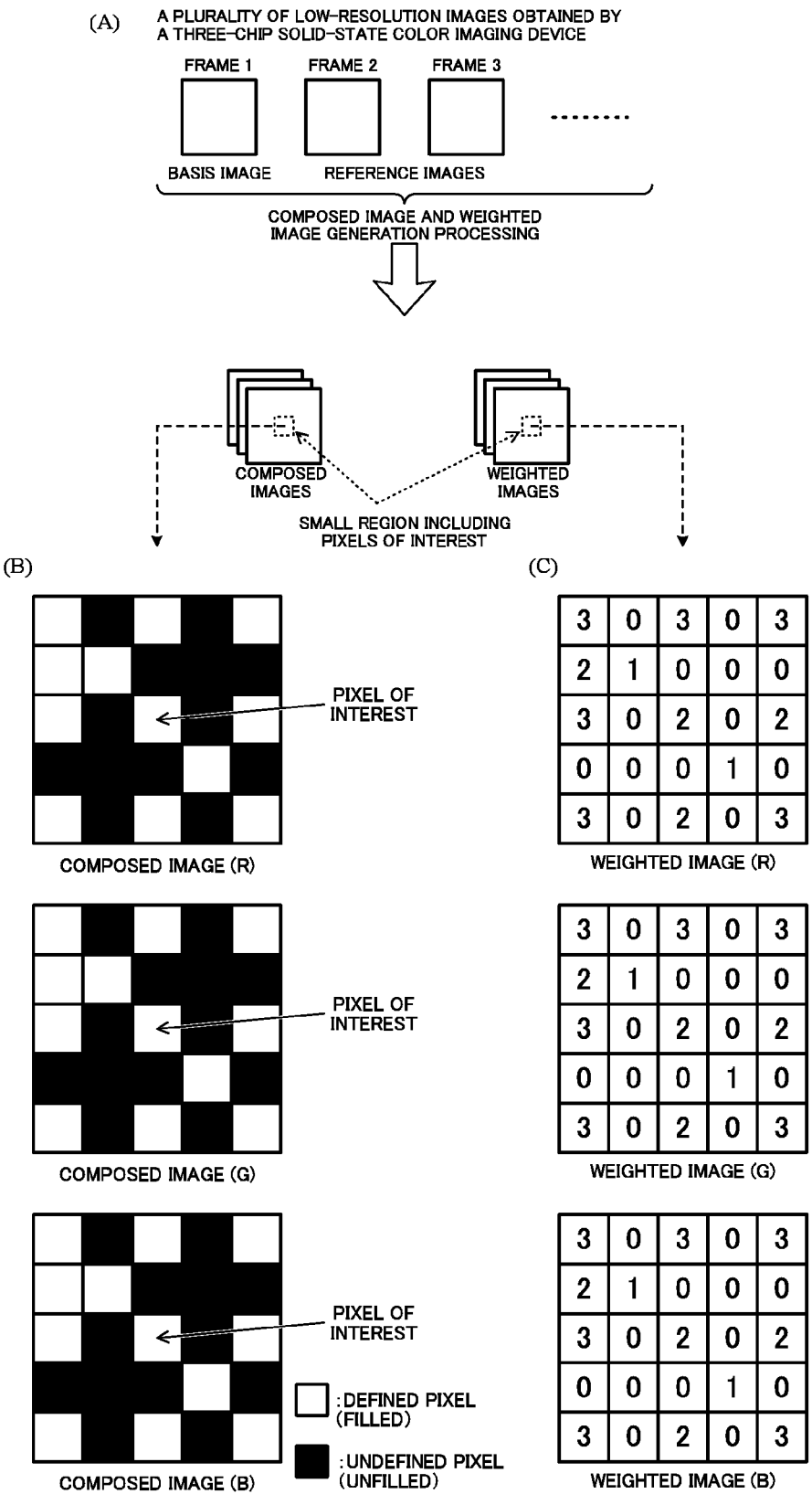
FIG. 4 is a conceptual diagram for illustrating composed images and weighted images in the case that a plurality of low-resolution images inputted into an image input unit of the image processing apparatus according to the present invention are images obtained by a three-chip solid-state color imaging device.

FIG. 4 is a conceptual diagram for illustrating the composed images and the weighted images that are generated by the composed image and weighted image generating unit 108 in the case that a plurality of low-resolution images inputted into the image input unit of the image processing apparatus according to the present invention are images obtained by a three-chip solid-state color imaging device.

As shown in FIG. 4, in the case that a plurality of low-resolution images that are inputted into the image input unit 100 and stored in the first storage unit 101 are images obtained by the three-chip solid-state color imaging device, for example, the basis image selecting unit 102 selects frame 1 as the basis image, and then the reference image selecting unit 103 selects other frames (frame 2, frame 3, . . . ) as the reference images.

And then, based on the basis image (frame 1) selected by the basis image selecting unit 102, the sub-pixel displacement amount on the high-resolution image space computed by the displacement amount computing unit 104 and the image information selected by the image information selecting unit 106, the composed image and weighted image generating unit 108 generates the composed images and the weighted images. For convenience of explanation, FIG. 4 conceptually illustrates the composed images and the weighted images that are generated with respect to a small region including a certain pixel of interest.

As shown in FIG. 4, the generated composed images are divided into a composed image (R) being a R component image, a composed image (G) being a G component image and a composed image (B) being a B component image, and the generated weighted images are divided into a weighted image (R) being a R component image, a weighted image (G) being a G component image and a weighted image (B) being a B component image.

And then, it is clear from FIG. 4 that in the case that a plurality of low-resolution images inputted into the image input unit 100 are images obtained by the three-chip solid-state color imaging device, positions of defined pixels in the composed image and the weighted image are the same in the R component image, the G component image and the B component image.

Figure 5:
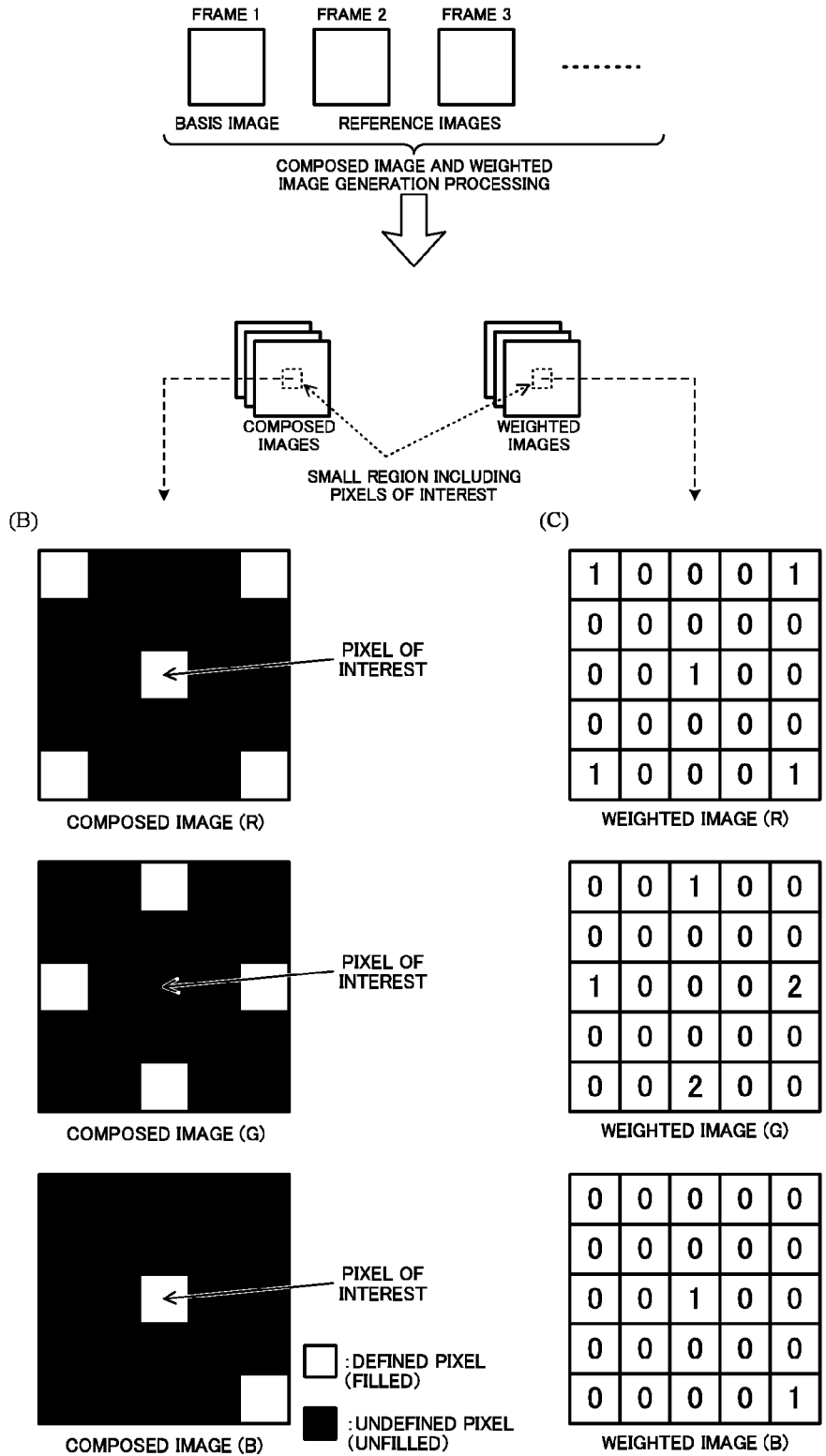
FIG. 5 is a conceptual diagram for illustrating composed images and weighted images in the case that a plurality of low-resolution images inputted into the image input unit of the image processing apparatus according to the present invention are images obtained by a single-chip solid-state color imaging device using a Bayer color filter.

FIG. 5 is a conceptual diagram for illustrating the composed images and the weighted images that are generated by the composed image and weighted image generating unit 108 in the case that a plurality of low-resolution images inputted into the image input unit of the image processing apparatus according to the present invention are images that are obtained by a single-chip solid-state color imaging device using a color filter and lack the color channel.

As shown in FIG. 5, in the case that a plurality of low-resolution images that are inputted into the image input unit 100 and stored in the first storage unit 101 are images obtained by the single-chip solid-state color imaging device, for example, the basis image selecting unit 102 selects frame 1 as the basis image, and then the reference image selecting unit 103 selects other frames (frame 2, frame 3, . . . ) as the reference images.

And then, based on the basis image (frame 1) selected by the basis image selecting unit 102, the sub-pixel displacement amount on the high-resolution image space computed by the displacement amount computing unit 104 and the image information selected by the image information selecting unit 106, the composed image and weighted image generating unit 108 generates the composed images and the weighted images. For convenience of explanation, FIG. 5 conceptually illustrates the composed images and the weighted images that are generated with respect to a small region including a certain pixel of interest.

As shown in FIG. 5, the generated composed images are divided into a composed image (R) being a R component image, a composed image (G) being a G component image and a composed image (B) being a B component image, and the generated weighted images are divided into a weighted image (R) being a R component image, a weighted image (G) being a G component image and a weighted image (B) being a B component image.

And then, it is clear from FIG. 5 that in the case that a plurality of low-resolution images inputted into the image input unit 100 are images that are obtained by the single-chip solid-state color imaging device using a color filter and lack the color channel, positions of defined pixels in the composed image and the weighted image are different in the R component image, the G component image and the B component image.

Next, the high-resolution grid image generating unit 110 reads out the composed images and the weighted image that are stored in the second storage unit 109 and generates high-resolution grid images by dividing the composed image that is read out by the weighted image that is read out (see step S180 of FIG. 2).

Moreover, in the high-resolution grid image generating unit 110, in generating the high-resolution grid image, in the case that the undefined pixel (i.e. the pixel that the pixel value is zero) exists in the weighted image, since a division by zero occurs, without dividing the composed image by the weighted image, generating the high-resolution grid image by directly setting the pixel value of the high-resolution grid image existing the pixel position of the undefined pixel of the weighted image to zero.

Figure 6:
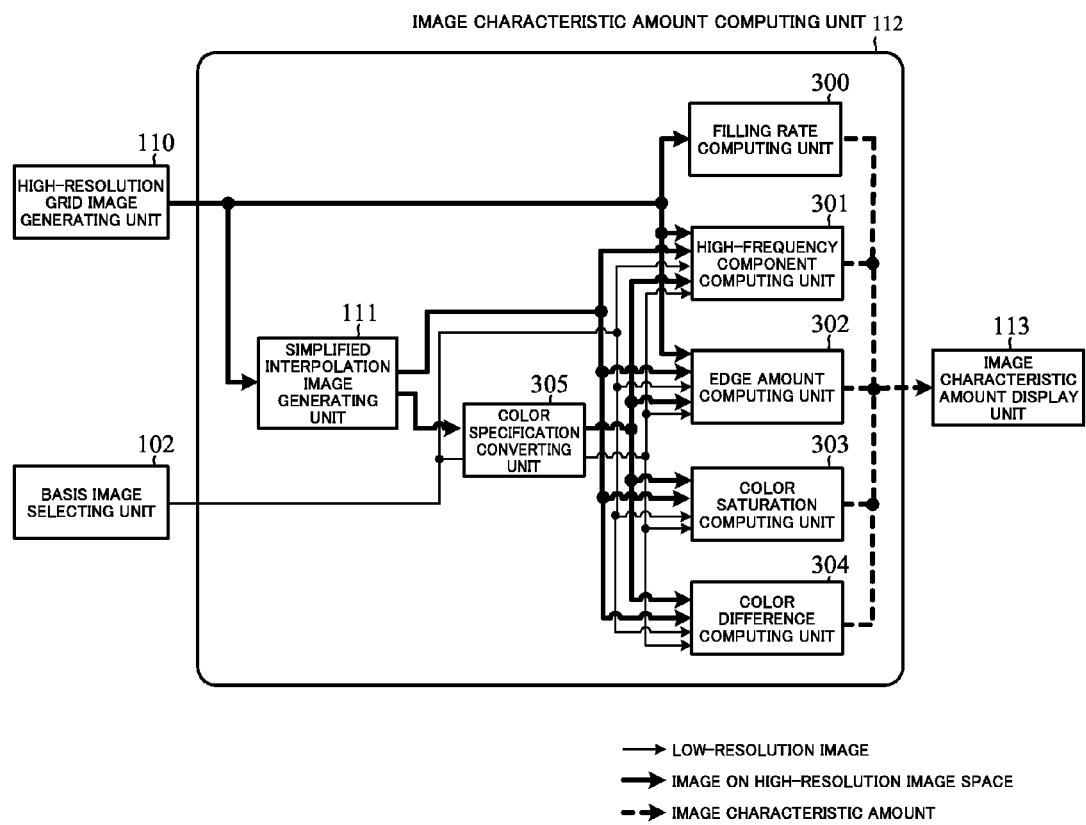
FIG. 6 is a configuration block diagram showing a first embodiment of an image characteristic amount computing unit 112 of the image processing apparatus according to the present invention.

Next, a simplified interpolation image generating unit 111 in the image characteristic amount computing unit 112 shown in FIG. 6, generates simplified interpolation images by performing a simplified interpolation image generation processing (see step S190 of FIG. 2) with respect to the high-resolution grid images generated by the high-resolution grid image generating unit 110.

The simplified interpolation image generation processing performed by the simplified interpolation image generating unit 111, means performing a simple interpolation processing that false color artifacts are easy to appear with respect to pixels that the pixel value of the high-resolution grid image is zero (hereinafter, also simply referred to as "missing pixels of the high-resolution grid image"). Here, the interpolation processing used in the simplified interpolation image generation processing, utilizes a bilinear interpolation processing. Moreover, the interpolation processing used in the simplified interpolation image generation processing is not limited to the bilinear interpolation processing, and for example, it is also possible to use existing interpolation processing methods such as a nearest neighbor method and a bicubic method.

Furthermore, although not shown in FIG. 1, it is also possible that the simplified interpolation image generating unit 111 interpolates by using pixel values of positions that accord with missing pixels of the high-resolution grid image in an image obtained by enlarging the basis image transmitted from the basis image selecting unit 102 on the high-resolution image space by the above-described interpolation processing.

Moreover, in the case that the high-resolution grid image is generated from the composed image and the weighted image that are generated based on a plurality of low-resolution images inputted into the image input unit of the image processing apparatus according to the present invention that are images that are obtained by the single-chip solid-state color imaging device using a color filter and lack the color channel, with respect to such missing pixels of the high-resolution grid image, when performing the simple interpolation processing by the simplified interpolation image generating unit 111, due to errors of interpolated values, in the generated simplified interpolation image, color balance of R, G and B colors collapses, and false color artifacts occur.

Here, in the case that the high-resolution grid image is generated from the composed image and the weighted image that are generated based on a plurality of low-resolution images inputted into the image input unit 100 that are images that are obtained by the single-chip solid-state color imaging device using a color filter and lack the color channel, a simplified interpolation image generated based on such a high-resolution grid image by the simplified interpolation image generating unit 111, is also referred to as "a simplified interpolation image concerning single-chip type image".

On the other hand, in the case that the high-resolution grid image is generated from the composed image and the weighted image that are generated based on a plurality of low-resolution images inputted into the image input unit 100 that are images obtained by the three-chip solid-state color imaging device, a simplified interpolation image generated from such a high-resolution grid image by the interpolation processing, is also referred to as "a simplified interpolation image concerning three-chip type image".

That is to say, in the present invention, in the case that it is not necessary to distinguish the type of a plurality of low-resolution images inputted into the image input unit 100, the above-described two types of simplified interpolation images are simply referred to as "the simplified interpolation image". However, in the case that it is necessary to distinguish the type of a plurality of low-resolution images inputted into the image input unit 100, using the simplified interpolation image concerning single-chip type image and the simplified interpolation image concerning three-chip type image as the situation demands.

FIG. 6 is a configuration block diagram showing a first embodiment of the image characteristic amount computing unit 112 of the image processing apparatus according to the present invention.

As shown in FIG. 6, the image characteristic amount computing unit 112 comprises the simplified interpolation image generating unit 111 for generating the simplified interpolation image, a filling rate computing unit 300 for computing the filling rate of the high-resolution grid image, a high-frequency component computing unit 301 for computing high-frequency components of the image, an edge amount computing unit 302 for computing edge amounts of the image, a color saturation computing unit 303 for computing the color saturation of the image, a color difference computing unit 304 for computing the color difference of the image, and a color specification converting unit 305 for performing a color specification conversion between images using different color specification systems, and computes the image characteristic amount by performing an image characteristic amount computation processing (see step S200 of FIG. 2) based on the high-resolution grid image generated by the high-resolution grid image generating unit 110, the simplified interpolation image and the basis image selected by the basis image selecting unit 102.

Here, both the high-resolution grid image and the simplified interpolation image are images on the high-resolution image space. And then, the image characteristic amount computed by the image characteristic amount computing unit 112, is displayed in the image characteristic amount display unit 113.

The image characteristic amount computation processing performed in the image characteristic amount computing unit 112 means at least one or more processes of a filling rate computation processing performed in the filling rate computing unit 300, a high-frequency component computation processing performed in the high-frequency component computing unit 301, an edge amount computation processing performed in the edge amount computing unit 302, a color saturation computation processing performed in the color saturation computing unit 303, and a color difference computation processing performed in the color difference computing unit 304.

Hereinafter, the processing performed in the image characteristic amount computing unit 112 will be described in detail.

At first, in the image characteristic amount computing unit 112, the filling rate computing unit 300 computes the filling rate of the high-resolution grid image (hereinafter, also simply referred to as "the filling rate") by performing the filling rate computation processing based on the high-resolution grid image. The filling rate computed by the filling rate computing unit 300, is displayed in the image characteristic amount display unit 113 as the image characteristic amount.

Hereinafter, the filling rate computation processing will be described in detail. In order to simplify the explanation, the filling rate computation processing in the case that the high-resolution grid image is a gray-scale image, will be described.

Here, N represents the number of pixels on the high-resolution image space. Further, K represents the number of defined pixels of the high-resolution grid image, and U represents the number of undefined pixels of the high-resolution grid image (i.e. the number of missing pixels of the high-resolution grid image).

The filling rate computation processing computes a filling rate p of the high-resolution grid image based on the following Expression 4. In other words, the filling rate of the high-resolution grid image means a rate of the number of undefined pixels of the high-resolution grid image with respect to the number of pixels on the high-resolution image space.

$$\rho = \frac{K}{N} = \frac{N-U}{N} \qquad \text{(Expression 4)}$$

Figure 7:
FIG. 7 shows examples of high-resolution grid images having different filling rates.
Figure 7:

FIG. 7 shows examples of high-resolution grid images having different filling rates. FIG. 7(A) is a high-resolution grid images having a filling rate 25%, N=40000, K=10000, and U=30000 hold, and the filling rate computed by the above Expression 4 becomes 25%. Further, FIG. 7(B) is a high-resolution grid images having a filling rate 75%, N=40000, K=30000, and U=10000 hold, and the filling rate computed by the above Expression 4 becomes 75%.

Moreover, in the case that a high-resolution grid image is a color image, the image characteristic amount computing unit 112 computes filling rates by respectively performing the same processing as the above-described filling rate computation processing with respect to R, G and B channels of that high-resolution grid image. In this case, the computed filling rates become a filling rate of R channel, a filling rate of G channel and a filling rate of B channel.

In the present invention, by displaying the filling rate computed based on the high-resolution grid image on the image characteristic amount display unit 113, i.e. by showing users that filling rate, it is possible to provide the users with a selection criterion of the reference image.

Figure 8:
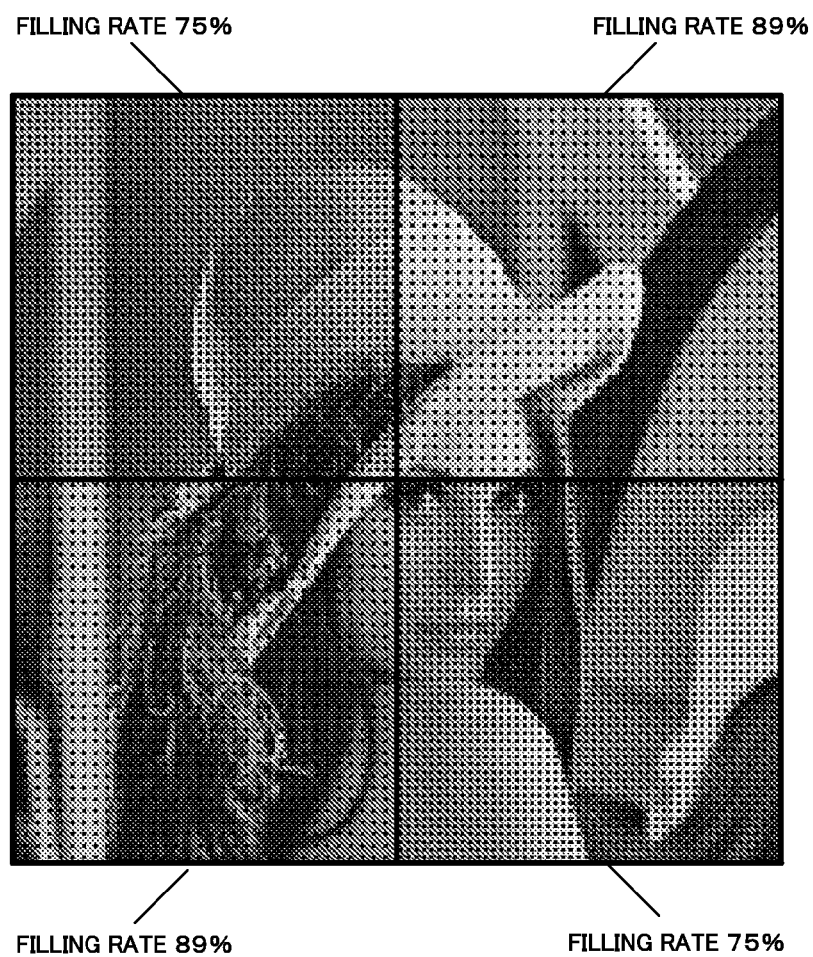
FIG. 8 is an example of one high-resolution grid image that indicates the filling rate computed for every small region.

Further, in the present invention, it is also possible that the filling rate computing unit 300 region-divides the high-resolution grid image into small regions as shown in FIG. 8, and computes the filling rate (the filling rate of the small region) based on the above Expression 4 (where, in this case, in Expression 4, N becomes the number of pixels on the high-resolution image space corresponding to a small region, K becomes the number of defined pixels of the high-resolution grid image belonging to the said small region, and U becomes the number of undefined pixels of the high-resolution grid image belonging to the said small region) with respect to each divided small region and simultaneously also computes a rate of the number of small regions having a filling rate more than or equal to a given threshold with respect to the total number of the divided small regions, and furthermore, the said rate computed by the filling rate computing unit 300 is also displayed in the image characteristic amount display unit 113 with the computed filling rates of the small regions as the image characteristic amount.

Moreover, depending on image quality of the high-resolution image that users want to acquire, the above-described given threshold is arbitrarily determined by users.

When explaining the above-described rate by using the high-resolution grid image shown in FIG. 8 as a concrete example, for example, in the case that the given threshold is set to 80%, since the number of small regions having the filling rate more than or equal to the given threshold (i.e. a filling rate more than or equal to 80%) is two and the total number of the divided small regions is four, the rate becomes 50%.

In the present invention, by displaying the above-described rate on the image characteristic amount display unit 113, i.e. by showing users that rate, it is possible to provide the users with an appropriate selection criterion of the reference image even in the case that biases of the filling rate occur in some small regions of the high-resolution grid image.

Next, the high-frequency component computing unit 301 respectively computes the high-frequency component of the image (hereinafter, also simply referred to as "the high-frequency component") with respect to the high-resolution grid image, the simplified interpolation image concerning three-chip type image and the basis image. The high-frequency component computed by the high-frequency component computing unit 301 is displayed in the image characteristic amount display unit 113 as the image characteristic amount.

As one concrete example, for example, the high-frequency component computing unit 301 respectively computes the high-frequency component of the image by applying a high-pass filter to each image. Further, it is also possible that the high-frequency component computing unit 301 respectively computes the high-frequency component of the image by performing a wavelet conversion with respect to each image.

Moreover, it is also possible that the high-frequency component computing unit 301 computes the high-frequency component with respect to at least one image of the high-resolution grid image, the simplified interpolation image concerning three-chip type image and the basis image.

Further, it is also possible that the high-frequency component computing unit 301 respectively normalizes the computed high-frequency component of the high-resolution grid image and the computed high-frequency component of the simplified interpolation image concerning three-chip type image. It is also possible that the normalized high-frequency component of the high-resolution grid image and the normalized high-frequency component of the simplified interpolation image concerning three-chip type image are displayed in the image characteristic amount display unit 113 as the image characteristic amount.

Further, it is also possible that the high-frequency component computing unit 301 computes a relative amount that is a ratio of the computed high-frequency component of the high-resolution grid image to the computed high-frequency component of the basis image (hereinafter, also simply referred to as "a relative high-frequency component of the high-resolution grid image") as a relative image characteristic amount. Moreover, it is also possible that the high-frequency component computing unit 301 computes a relative amount that is a ratio of the computed high-frequency component of the simplified interpolation image concerning three-chip type image to the computed high-frequency component of the basis image (hereinafter, also simply referred to as "a relative high-frequency component of the simplified interpolation image concerning three-chip type image") as a relative image characteristic amount. It is also possible that the relative high-frequency component of the high-resolution grid image and the relative high-frequency component of the simplified interpolation image concerning three-chip type image that are computed by the high-frequency component computing unit 301 are displayed in the image characteristic amount display unit 113 as the relative image characteristic amount.

Next, the edge amount computing unit 302 respectively computes the edge amount of the image (hereinafter, also simply referred to as "the edge amount") by applying an edge detection filter to the high-resolution grid image, the simplified interpolation image concerning three-chip type image and the basis image. The edge amount computed by the edge amount computing unit 302 is displayed in the image characteristic amount display unit 113 as the image characteristic amount. Further, in the edge amount computing unit 302, for example, a differential filter, a Sobel filter or a Laplacian filter can be used as the edge detection filter.

In the edge amount computing unit 302, for example, in the case of using a Laplacian filter as the edge detection filter, a value of integral of Laplacian of whole image is set to the edge amount.

Further, it is also possible that the edge amount computing unit 302 computes a relative amount that is a ratio of the computed edge amount of the high-resolution grid image to the computed edge amount of the basis image (hereinafter, also simply referred to as "a relative edge amount of the high-resolution grid image") as a relative image characteristic amount. Moreover, it is also possible that the edge amount computing unit 302 computes a relative amount that is a ratio of the computed edge amount of the simplified interpolation image concerning three-chip type image to the computed edge amount of the basis image (hereinafter, also simply referred to as "a relative edge amount of the simplified interpolation image concerning three-chip type image") as a relative image characteristic amount. It is also possible that the relative edge amount of the high-resolution grid image and the relative edge amount of the simplified interpolation image concerning three-chip type image that are computed by the edge amount computing unit 302 are displayed in the image characteristic amount display unit 113 as the relative image characteristic amount.

Further, it is also possible that the edge amount computing unit 302 respectively normalizes the computed edge amount of the high-resolution grid image and the computed edge amount of the simplified interpolation image concerning three-chip type image. It is also possible that the normalized edge amount of the high-resolution grid image and the normalized edge amount of the simplified interpolation image concerning three-chip type image are displayed in the image characteristic amount display unit 113 as the image characteristic amount.

In the present invention, in the case that in the image information selecting unit 106, a lot of pixels from a plurality of reference images are abandoned (i.e. a small number of pixels from a plurality of reference images are selected), as a result, the filling rate of the high-resolution grid image is low, or in the case that the number of low-resolution images inputted into the image input unit 100 is small, as a result, the filling rate of the high-resolution grid image is low, the high-resolution grid image becomes discontinuous due to influences of undefined pixels (i.e. pixels that the pixel value is zero), hence the high-frequency component and the edge amount of the high-resolution grid image become large.

On the other hand, in the case that the filling rate of the high-resolution grid image is high, since the high-resolution grid image becomes smooth, the high-frequency component and the edge amount of the high-resolution grid image decrease.

Therefore, the image characteristic amounts such as the high-frequency component and the edge amount of the high-resolution grid image, can become an indication for determining whether users are able to acquire the optimal low-resolution image set for super-resolution processing or not.

Here, the color specification converting unit 305 will be described. Hereinafter, an image using an RGB color specification system is also simply referred to as "an RGB image". Further, an image using an HSI color specification system is also simply referred to as "an HIS image". An image using a YCbCr color specification system is also simply referred to as "a YCbCr image". Moreover, an image using an L*a*b* color specification system is also simply referred to as "an L*a*b* image".

The following description assumes that both the basis image and the simplified interpolation image are the RGB image.

In the image characteristic amount computing unit 112, the color specification converting unit 305 respectively converts the basis image and the simplified interpolation image that are the RGB image to the YCbCr image by performing a YCbCr conversion and respectively converts the basis image and the simplified interpolation image that are the RGB image to the HSI image by performing an HSI conversion.

In the color specification converting unit 305, the YCbCr conversion for converting the RGB image to the YCbCr image is performed based on the following Expression 5.

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix}$$ (Expression 5)

Further, in the color specification converting unit 305, it is possible to use an L*a*b* conversion as a substitute for the HSI conversion. That is to say, it is also possible that the color specification converting unit 305 respectively converts the basis image and the simplified interpolation image that are the RGB image to the YCbCr image by performing the YCbCr conversion and respectively converts the basis image and the simplified interpolation image that are the RGB image to the L*a*b* image by performing the L*a*b* conversion.

Hereinafter, in the case that the simplified interpolation image inputted into the image characteristic amount computing unit 112 is the simplified interpolation image concerning single-chip type image, the processing performed in the image characteristic amount computing unit 112 will be described in detail.

In the case that the simplified interpolation image concerning single-chip type image is inputted into the image characteristic amount computing unit 112, firstly, the color specification converting unit 305 respectively converts the basis image and the simplified interpolation image concerning single-chip type image to the YCbCr image by performing the YCbCr conversion and respectively converts the basis image and the simplified interpolation image concerning single-chip type image to the HSI image by performing the HSI conversion.

Here, the color saturation computing unit 303 computes the color saturation S of the simplified interpolation image concerning single-chip type image (the HSI image) HSI-converted by the color specification converting unit 305 as the image characteristic amount. Further, it is also possible that the color saturation computing unit 303 computes the color saturation S of the simplified interpolation image concerning single-chip type image (the L*a*b* image) L*a*b*-converted by the color specification converting unit 305.

Further, the color difference computing unit 304 computes the color difference of the simplified interpolation image concerning single-chip type image (the YCbCr image)

YCbCr-converted by the color specification converting unit 305 as the image characteristic amount.

Concretely, the color difference computing unit 304 sets the color difference as the image characteristic amount to C, and for example, computes the color difference C based on the following Expression 6. Where, Cb and Cr are the color difference component Cb and the color difference component Cr of the YCbCr-converted simplified interpolation image concerning single-chip type image (the YCbCr image), respectively.

$$C=\sqrt{Cr^2+Cb^2}$$ (Expression 6)

In the meantime, in the simplified interpolation image generating unit 111, in the case of performing the interpolation processing of missing pixels (undefined pixels) of the high-resolution grid image generated from the composed image and the weighted image that are generated based on a plurality of low-resolution images inputted into the image input unit 100 being images that are obtained by a single-chip solid-state color imaging device using a color filter and lack the color channel and generating the simplified interpolation image concerning single-chip type image, since false color artifacts occur due to interpolation errors, the color saturation and the color difference of the image concerning single-chip type image become high values. In particular, the interpolation errors of high-frequency components of the image such as edges and isolated points become remarkable.

Hence, the image characteristic amount computing unit 112 transmits the simplified interpolation image concerning single-chip type image (the YCbCr image) YCbCr-converted by the color specification converting unit 305 to the high-frequency component computing unit 301 and respectively computes high-frequency components of the color difference component Cb and the color difference component Cr of the YCbCr-converted simplified interpolation image concerning single-chip type image (the YCbCr image).

Moreover, the image characteristic amount computing unit 112 also transmits the simplified interpolation image concerning single-chip type image (the YCbCr image) YCbCr-converted by the color specification converting unit 305 to the edge amount computing unit 302 and respectively computes edge amounts of the color difference component Cb and the color difference component Cr of the YCbCr-converted simplified interpolation image concerning single-chip type image (the YCbCr image).

Further, the image characteristic amount computing unit 112 computes the high-frequency component and the edge amount with respect to the color saturation S of the simplified interpolation image concerning single-chip type image.

Concretely, the image characteristic amount computing unit 112 transmits the simplified interpolation image concerning single-chip type image (the HSI image) HSI-converted by the color specification converting unit 305 to the high-frequency component computing unit 301 and computes the high-frequency component of the color saturation S of the HSI-converted simplified interpolation image concerning single-chip type image (the HSI image).

Moreover, the image characteristic amount computing unit 112 also transmits the simplified interpolation image concerning single-chip type image (the HSI image) HSI-converted by the color specification converting unit 305 to the edge amount computing unit 302 and computes the edge amount of the color saturation S of the HSI-converted simplified interpolation image concerning single-chip type image (the HSI image).

Figure 9:
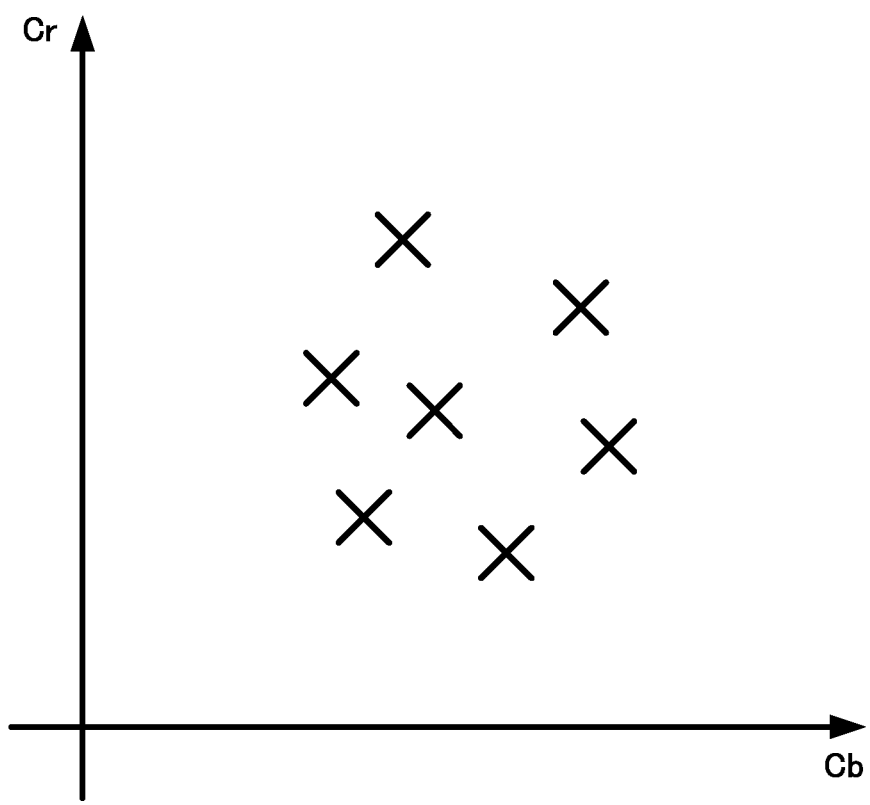
FIG. 9 is an example that plots distributions of a color difference component Cb and a color difference component Cr of each pixel in the vicinity of edges and isolated points.

Further, in the image characteristic amount computing unit 112, as the image characteristic amount obtained from the color difference and the color saturation, as shown in FIG. 9, it is also possible to compute the statistics amount such as variances of a distribution diagram obtained by plotting the color difference component Cb and the color difference component Cr of each pixel in the vicinity of edges and isolated points in a CbCr plane and so on.

Further, it is also possible that the color saturation computing unit 303 computes the color saturation of the basis image HSI-converted by the color specification converting unit 305, and computes a relative amount that is a ratio of the computed color saturation of the simplified interpolation image concerning single-chip type image to the computed color saturation of the basis image (hereinafter, also simply referred to as "a relative color saturation of the simplified interpolation image concerning single-chip type image") as the relative image characteristic amount. Moreover, it is also possible that the relative color saturation of the simplified interpolation image concerning single-chip type image that is computed by the color saturation computing unit 303, is displayed in the image characteristic amount display unit 113 as the relative image characteristic amount.

Further, it is also possible that the color difference computing unit 304 computes the color difference of the basis image YCbCr-converted by the color specification converting unit 305, and computes a relative amount that is a ratio of the computed color difference of the simplified interpolation image concerning single-chip type image to the computed color difference of the basis image (hereinafter, also simply referred to as "a relative color difference of the simplified interpolation image concerning single-chip type image") as the relative image characteristic amount. Moreover, it is also possible that the relative color difference of the simplified interpolation image concerning single-chip type image that is computed by the color difference computing unit 304, is displayed in the image characteristic amount display unit 113 as the relative image characteristic amount.

The first embodiment of the image characteristic amount computing unit 112 of the image processing apparatus according to the present invention is described as above.

Figure 10:
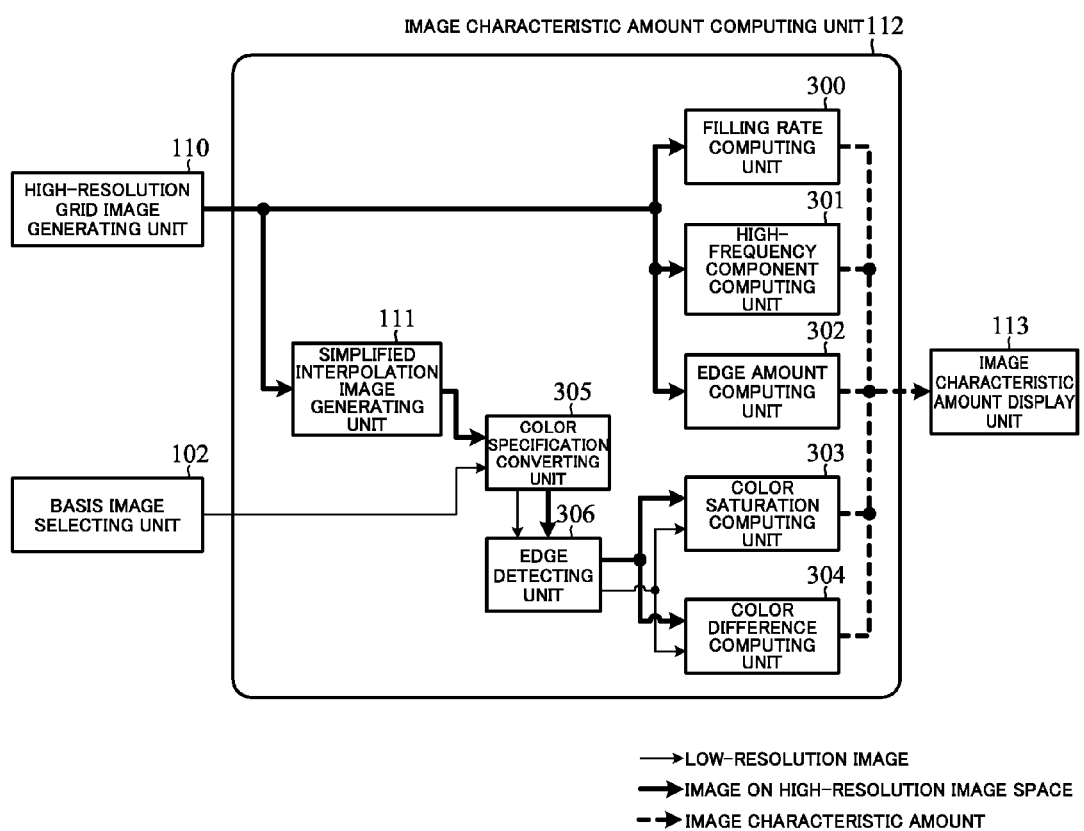
FIG. 10 is a configuration block diagram showing a second embodiment of the image characteristic amount computing unit 112 of the image processing apparatus according to the present invention.

FIG. 10 is a configuration block diagram showing a second embodiment of the image characteristic amount computing unit 112 of the image processing apparatus according to the present invention.

As shown in FIG. 10, the image characteristic amount computing unit 112 comprises the simplified interpolation image generating unit 111 for generating the simplified interpolation image, the filling rate computing unit 300 for computing the filling rate of the high-resolution grid image, the high-frequency component computing unit 301 for computing high-frequency components of the image, the edge amount computing unit 302 for computing edge amounts of the image, the color saturation computing unit 303 for computing the color saturation of the image, the color difference computing unit 304 for computing the color difference of the image, the color specification converting unit 305 for performing a color specification conversion between images using different color specification systems and an edge detecting unit 306 for detecting edges and isolated points of the image, and computes the image characteristic amount by performing the image characteristic amount computation processing (see step S200 of FIG. 2) based on the high-resolution grid image generated by the high-resolution grid image generating unit 110, the simplified interpolation image and the basis image selected by the basis image selecting unit 102. And then, the image characteristic amount computed by the image characteristic amount computing unit 112 is displayed in the image characteristic amount display unit 113.

In the second embodiment of the image characteristic amount computing unit 112 shown in FIG. 10, the high-resolution grid image generated by the high-resolution grid image generating unit 110 is respectively transmitted to the filling rate computing unit 300, the high-frequency component computing unit 301 and the edge amount computing unit 302, the filling rate computing unit 300 computes the filling rate of the high-resolution grid image as the image characteristic amount, the high-frequency component computing unit 301 computes the high-frequency component of the high-resolution grid image as the image characteristic amount, and the edge amount computing unit 302 computes the edge amount of the high-resolution grid image as the image characteristic amount. Moreover, in the second embodiment of the image characteristic amount computing unit 112, since processes performed in the filling rate computing unit 300, the high-frequency component computing unit 301 and the edge amount computing unit 302 are the same as those processes of the first embodiment of the image characteristic amount computing unit 112 shown in FIG. 6, detailed descriptions of the processes are omitted.

A point that is different from the configuration of the first embodiment of the image characteristic amount computing unit 112 shown in FIG. 6, is that in the second embodiment of the image characteristic amount computing unit 112 shown in FIG. 10, the simplified interpolation image and the basis image that are color-specification-converted by the color specification converting unit 305 are transmitted to the edge detecting unit 306, and then the edges and the isolated points that are detected by the edge detecting unit 306 are respectively transmitted to the color saturation computing unit 303 and the color difference computing unit 304.

In the second embodiment of the image characteristic amount computing unit 112 shown in FIG. 10, since the processing performed in the color specification converting unit 305 is the same as the processing of the color specification converting unit 305 of the first embodiment of the image characteristic amount computing unit 112 shown in FIG. 6, detailed description of the processing is omitted.

In the second embodiment of the image characteristic amount computing unit 112, the edge detecting unit 306 detects edges and isolated points of the simplified interpolation image from a luminance component Y of the simplified interpolation image by applying an edge detection filter to the YCbCr-converted simplified interpolation image, and simultaneously detects edges and isolated points of the simplified interpolation image from an intensity component I of the simplified interpolation image by applying the edge detection filter to the HSI-converted simplified interpolation image. Moreover, for example, a differential filter, a Sobel filter or a Laplacian filter can be used as the edge detection filter.

In the second embodiment of the image characteristic amount computing unit 112, the edges and the isolated points of the simplified interpolation image detected from the luminance component Y of the simplified interpolation image are transmitted to the color difference computing unit 304, and the edges and the isolated points of the simplified interpolation image detected from the intensity component I of the simplified interpolation image are transmitted to the color saturation computing unit 303.

In the second embodiment of the image characteristic amount computing unit 112, the color difference computing unit 304 computes the color difference in the vicinity of the edges and the isolated points of the simplified interpolation image detected from the luminance component Y of the simplified interpolation image based on the above Expression 6 as the image characteristic amount.

Further, in the second embodiment of the image characteristic amount computing unit 112, the color saturation computing unit 303 computes the color saturation S in the vicinity of the edges and the isolated points of the simplified interpolation image detected from the intensity component I of the simplified interpolation image as the image characteristic amount. Further, it is also possible that the color saturation computing unit 303 computes the color saturation S in the vicinity of the edges and the isolated points of the simplified interpolation image from the simplified interpolation image $L^*a^*b^*$-converted by the color specification converting unit 305.

Moreover, in the second embodiment of the image characteristic amount computing unit 112, it is also possible that the color saturation computing unit 303 computes the color saturation S in the vicinity of the edges and the isolated points of the basis image detected from the intensity component I of the basis image, and computes a relative amount that is a ratio of the computed color saturation in the vicinity of the edges and the isolated points of the simplified interpolation image to the computed color saturation in the vicinity of the edges and the isolated points of the basis image (hereinafter, also simply referred to as "a relative color saturation in the vicinity of the edges and the isolated points of the simplified interpolation image") as the relative image characteristic amount. Moreover, it is also possible that the relative color saturation in the vicinity of the edges and the isolated points of the simplified interpolation image that is computed by the color saturation computing unit 303, is displayed in the image characteristic amount display unit 113 as the relative image characteristic amount.

Further, in the second embodiment of the image characteristic amount computing unit 112, it is also possible that the color difference computing unit 304 computes the color difference in the vicinity of the edges and the isolated points of the basis image detected from the luminance component Y of the basis image, and computes a relative amount that is a ratio of the computed color difference in the vicinity of the edges and the isolated points of the simplified interpolation image to the computed color difference in the vicinity of the edges and the isolated points of the basis image (hereinafter, also simply referred to as "a relative color difference in the vicinity of the edges and the isolated points of the simplified interpolation image") as the relative image characteristic amount. Moreover, it is also possible that the relative color difference in the vicinity of the edges and the isolated points of the simplified interpolation image that is computed by the color difference computing unit 304, is displayed in the image characteristic amount display unit 113 as the relative image characteristic amount.

In the present invention, by using the configuration of the second embodiment of the image characteristic amount computing unit 112, even a region having high color saturation exists in a flat portion, it is possible to unaffectedly obtain false color artifacts due to interpolation errors and the color saturation.

Moreover, it is also possible that both the first embodiment of the image characteristic amount computing unit 112 and the second embodiment of the image characteristic amount computing unit 112 are a configuration comprising at least one or more processing units of the filling rate computing unit 300, the high-frequency component computing unit 301, the edge amount computing unit 302, the color saturation computing unit 303 and the color difference computing unit 304.

Next, the image characteristic amount display unit 113 displays the image characteristic amounts (the filling rate, the high-frequency component, the edge amount, the color saturation and the color difference) computed by the image characteristic amount computing unit 112 (see step S210 of FIG. 2).

Moreover, it is also possible that the image characteristic amount display unit 113 displays at least one or more image characteristic amounts of the image characteristic amounts being the filling rate, the high-frequency component, the edge amount, the color saturation and the color difference that are computed by the image characteristic amount computing unit 112.

Figure 11:
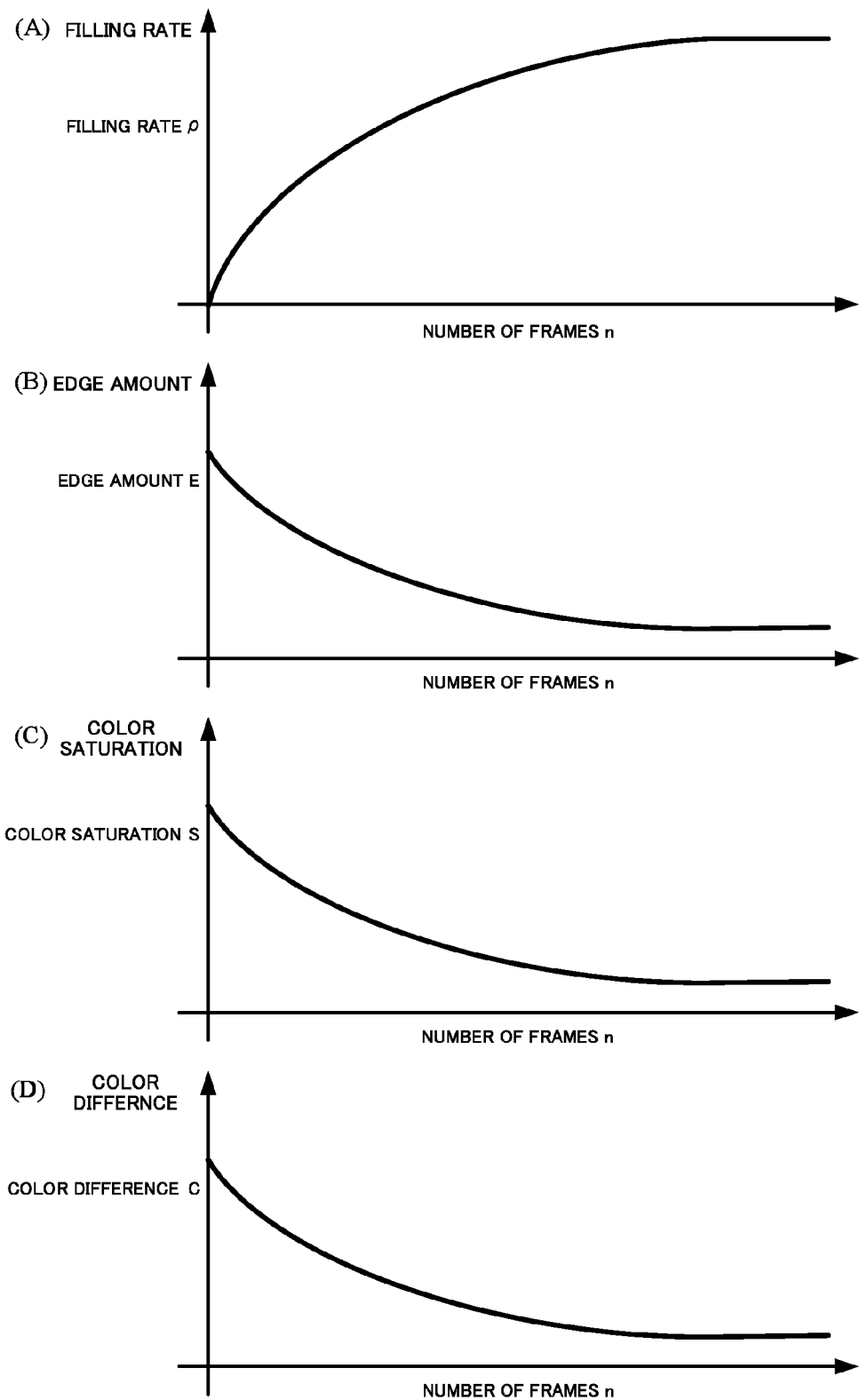
FIG. 11 shows examples in the case of displaying changes in image characteristic amounts in an image characteristic amount display unit 113.

Further, it is also possible that the image characteristic amount display unit 113 displays changes in the image characteristic amounts computed by the image characteristic amount computing unit 112. FIG. 11 shows examples in the case of displaying the changes in the image characteristic amounts in the image characteristic amount display unit 113.

As shown in FIG. 11, displaying the changes in the image characteristic amounts on the basis of the basis image and by a transition to the frame direction. FIG. 11 (A) displays the transition of the filling rate by the transition to the frame direction, FIG. 11 (B) displays the transition of the edge amount by the transition to the frame direction, FIG. 11 (C) displays the transition of the color saturation by the transition to the frame direction and FIG. 11 (D) displays the transition of the color difference by the transition to the frame direction.

Moreover, in the image characteristic amount display unit 113, displaying the changes in the image characteristic amounts is not limited to the transition to the frame direction, it is also possible to display the changes in the image characteristic amounts by a transition to the time direction.

In the present invention, by displaying the changes in the image characteristic amounts by the image characteristic amount display unit 113, it is possible to further enhance user's convenience.

Since a user visually recognizes the image characteristic amounts displayed in the image characteristic amount display unit 113, the user can understand whether a plurality of reference images being enough for the super-resolution processing that completely satisfactory image quality of the user is obtained, are selected or not (see step S220 of FIG. 2).

That is to say, in the present invention, by displaying the image characteristic amounts in the image characteristic amount display unit 113, the user can visually recognize the displayed image characteristic amounts, it becomes possible that the user understands the filling state of pixels of the high-resolution grid image, the false color amount of the simplified interpolation image and so on, and the user can understand whether a plurality of reference images being enough for the super-resolution processing that completely satisfactory image quality of the user is obtained, are selected or not.

In accordance with user's visual recognition result of the image characteristic amounts, the external I/F control unit 114 controls at least one process of the process performed in the parameter setting unit 107, the process performed in the reference image selecting unit 103 and the process performed in the image input unit 100.

That is to say, in the image processing apparatus according to the present invention, in the case that the user determines that a plurality of reference images being enough for the super-resolution processing that completely satisfactory image quality of the user is obtained, are not selected by visually recognizing the image characteristic amounts displayed in the image characteristic amount display unit 113 (see "NO" of step S220 of FIG. 2), in accordance with the situation of visually-recognized image characteristic amounts, through the external I/F control unit 114, after performing at least one process of a process (1) that processes so as to return to step S150 of FIG. 2 (the parameter setting unit 107) and set the threshold of the parameter again through the user, a process (2) that processes so as to return to step S120 of FIG. 2 (the reference image selecting unit 103) and set the given number of reference images to be selected again through the user, and a process (3) that processes so as to return to step S100 of FIG. 2 (the image input unit 100) and input the given number of low-resolution images selected by the user, subsequent processes are repeated.

Concretely, for example, in the case of determining that the filling state of pixels on the high-resolution image space is bad based on the user's visual recognition of the image characteristic amounts, that is to say, in the case of determining that a plurality of reference images being enough for the super-resolution processing that completely satisfactory image quality of the user is obtained, are not selected, through the external I/F control unit 114, the user sets the given number of the reference image selecting unit 103 again so as to increase the given number of reference images, or loosens the threshold of the parameter of the parameter setting unit 107 (for example, in the case of using the SSD as the parameter, enlarging the threshold of the SSD).

Further, in the case of determining that the number of low-resolution images stored in the first storage unit 101 is insufficient based on the user's visual recognition of the image characteristic amounts, through the external I/F control unit 114, the image input unit 100 inputs the given number of low-resolution images that the given number is set by the user, and then these inputted low-resolution images are stored in the first storage unit 101.

Moreover, in the present invention, in the case of changing the number of reference images that is selected by the user by sequentially storing the composed image and the weighted image that are generated by the composed image and weighted image generating unit 108 in the second storage unit 109, it is possible to reflect the change in the number of reference images by just reading out the composed image and the weighted image from the second storage unit 109.

On the other hand, in the image processing apparatus according to the present invention, in the case that the user determines that a plurality of reference images being enough for the super-resolution processing that completely satisfactory image quality of the user is obtained, are selected by visually recognizing the image characteristic amounts displayed in the image characteristic amount display unit 113 (see "YES" of step S220 of FIG. 2), the reconstruction processing unit 115 reads out the composed images and the weighted images that are stored in the second storage unit 109, and generates the high-resolution image by performing a reconstruction processing (see step S230 of FIG. 2) with respect to the composed images and the weighted images that are read out.

The reconstruction processing performed by the reconstruction processing unit 115 uses a reconstruction processing being the existing techniques such as an MAP (Maximum A Posteriori) method or color kernel regression.

Finally, the high-resolution image output unit 116 outputs the high-resolution image generated by the reconstruction processing unit 115. And then, the processes performed in the image processing apparatus according to the present invention (the image processing apparatus 1) end.

In the image processing apparatus 1 of the present invention, by performing the above-described processes, it becomes possible to aid that users acquire the optimal low-resolution image set for the super-resolution processing, that is to say, according to the present invention, since the low-resolution image set that has sub-pixel displacements being necessary for the super-resolution processing is sufficiently obtained, it is possible to generate the high-resolution image with high image quality.

Figure 12:
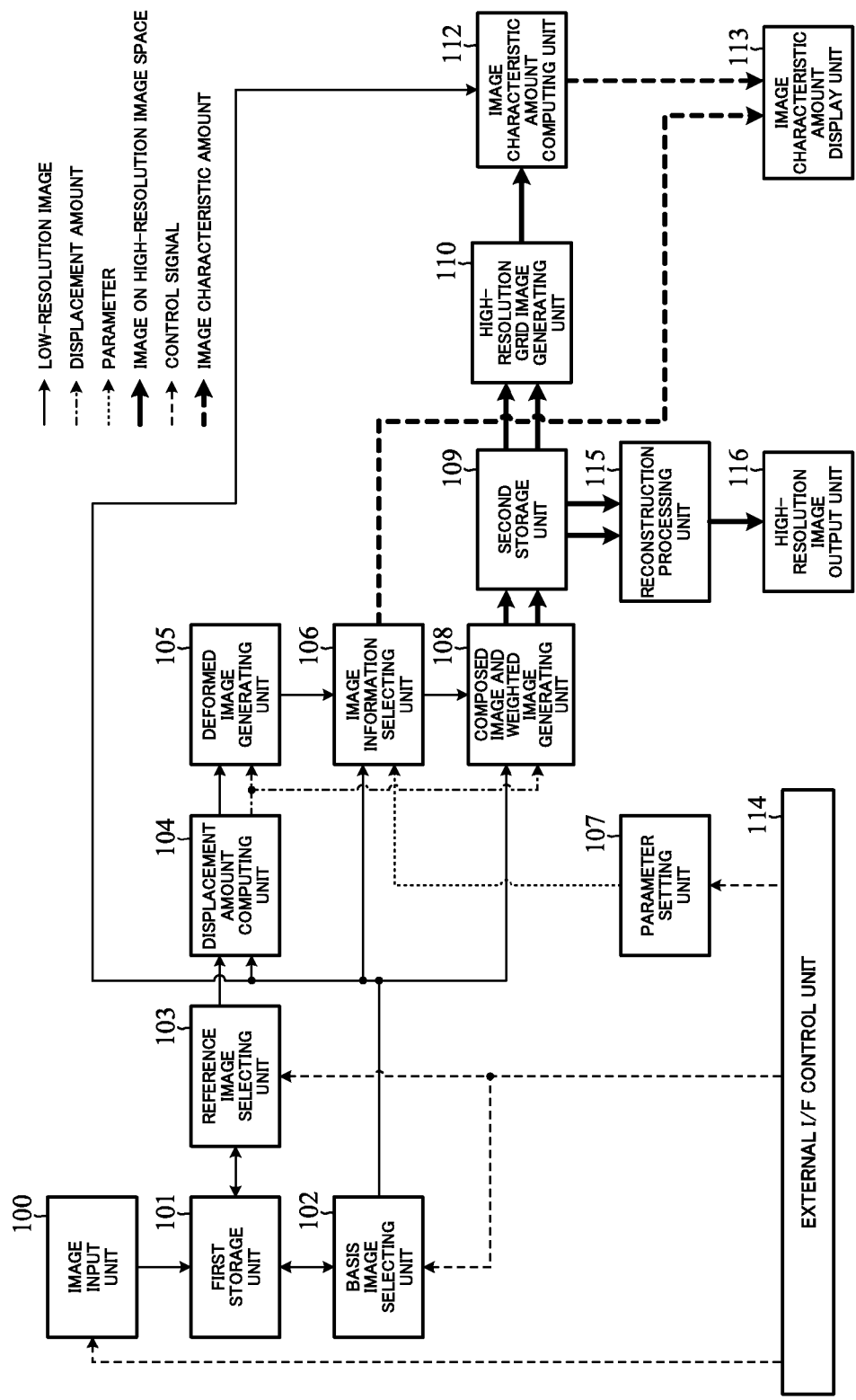
FIG. 12 is a configuration block diagram showing a second embodiment of the image processing apparatus according to the present invention.
Figure 13:
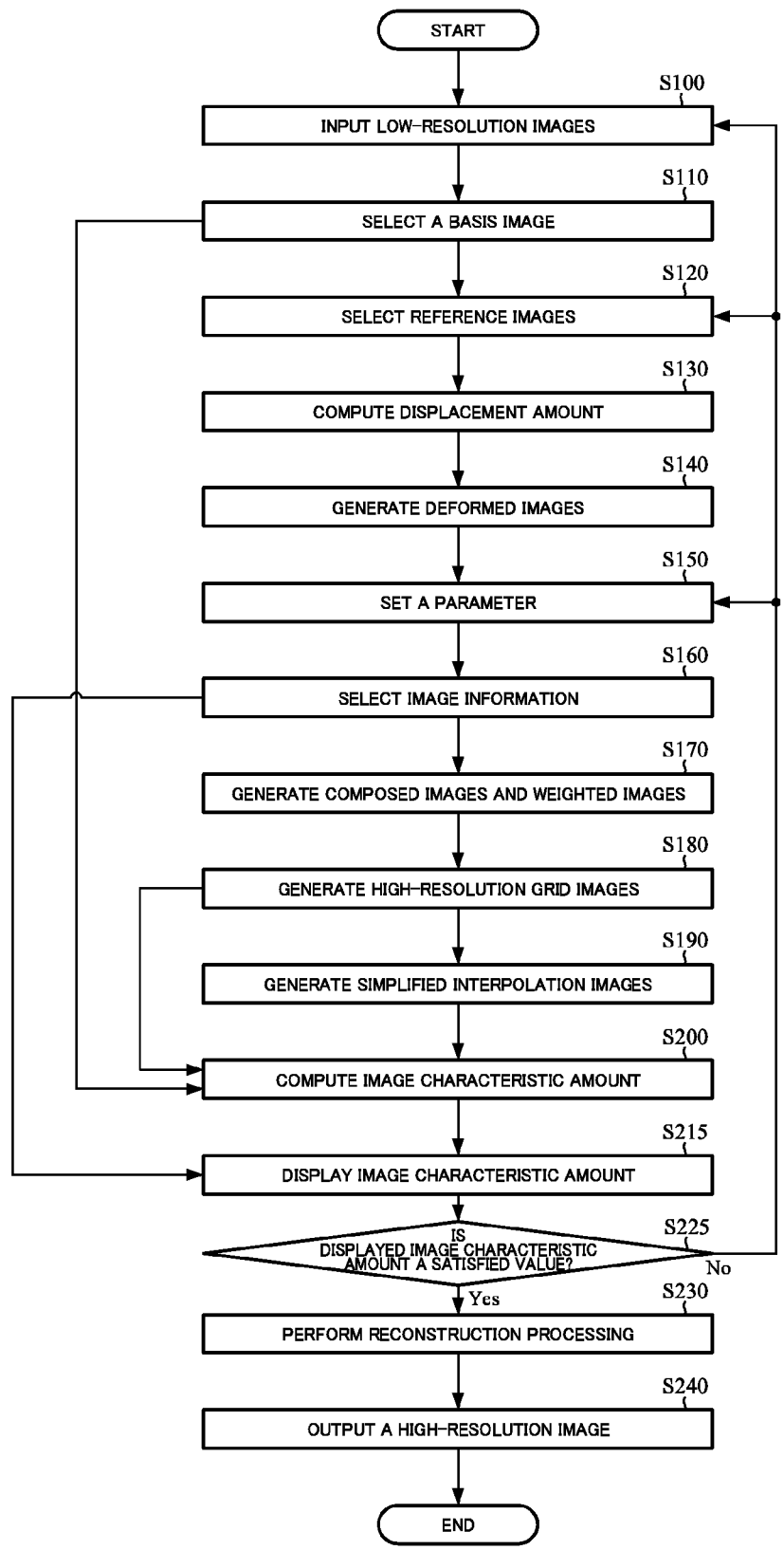
FIG. 13 is a flow chart showing processing flow of the image processing apparatus according to the second embodiment of the present invention shown in FIG. 12.

FIG. 12 is a configuration block diagram showing a second embodiment of the image processing apparatus according to the present invention (hereinafter, also simply referred to as "an image processing apparatus 2 according to the present invention" or "an image processing apparatus 2"). Further, FIG. 13 is a flow chart showing processing flow of the image processing apparatus 2 according to the present invention shown in FIG. 12.

It is clear by comparing FIG. 12 with FIG. 1 that the image processing apparatus 2 and the image processing apparatus 1 are different in that the image information selecting unit 106 of the image processing apparatus 1 is not connected to the image characteristic amount display unit 113, meanwhile, the image information selecting unit 106 of the image processing apparatus 2 is connected to the image characteristic amount display unit 113.

Except the above different point, since the image processing apparatus 2 is the same as the image processing apparatus 1 in both the configuration and the processes, descriptions about the configuration except the above different point are omitted.

Here, the above different point will be described in detail.

As shown in FIG. 12 and FIG. 13, the image processing apparatus 2 displays the value of the parameter computed by the image information selecting unit 106 in the image characteristic amount display unit 113 as the image characteristic amount (see step S215 of FIG. 13).

As described above, in the present invention, it is possible to use the similarity or the dissimilarity between images as the parameter. As the similarity or the dissimilarity between images, it is possible to use the SSD, the SAD and the NCC between the basis image and the deformed image that are respectively obtained based on the above Expression 1, Expression 2 and Expression 3.

Here, for example, in the case of using the SSD between the basis image and the deformed image as the parameter, the image processing apparatus 2 displays the value of the SSD between the basis image and the deformed image computed by the image information selecting unit 106 in the image characteristic amount display unit 113 as the image characteristic amount.

Moreover, in the image processing apparatus 2, in the case of using the similarity or the dissimilarity between images as the parameter, in the image information selecting unit 106, it is possible to compute the similarity or the dissimilarity between the basis image and each deformed image for every corresponding image as the image characteristic amount, further, it is also possible to respectively region-divide the basis image and each deformed image into small regions and compute the similarity or the dissimilarity between the basis image and each deformed image for every divided small region as the image characteristic amount, moreover, it is also possible to compute a rate of the number of small regions having the similarity being equal to or more than a given threshold to the total number of small regions obtained by region-dividing the deformed image as the image characteristic amount.

Next, in the image processing apparatus 2, since a user visually recognizes the image characteristic amounts that is transmitted from the image information selecting unit 106 and displayed in the image characteristic amount display unit 113, the user can understand whether a plurality of reference images being enough for the super-resolution processing that completely satisfactory image quality of the user is obtained, are selected or not (see step S225 of FIG. 13).

In the image processing apparatus 2, in the case that the user determines that a plurality of reference images being enough for the super-resolution processing that completely satisfactory image quality of the user is obtained, are not selected by visually recognizing the image characteristic amounts that is transmitted from the image information selecting unit 106 and displayed in the image characteristic amount display unit 113 (see "NO" of step S225 of FIG. 13), in accordance with the situation of visually-recognized image characteristic amounts, through the external I/F control unit 114, after performing a process that processes so as to return to step S120 of FIG. 13 (the reference image selecting unit 103) and select a plurality of reference images to be used in the super-resolution processing through the user, subsequent processes are repeated.

Further, since it is preferred to select only reference images being successful in the registration as the reference images to be used in the super-resolution processing, in the image processing apparatus 2, since the user visually recognizes the image characteristic amounts that is transmitted from the image information selecting unit 106 and displayed in the image characteristic amount display unit 113, through the external I/F control unit 114, in the reference image selecting unit 103, a plurality of reference images to be used in the super-resolution processing can be properly selected by the user.

In the image processing apparatus 2 of the present invention, by performing the above-described processes, it becomes possible to aid that users acquire the optimal low-resolution image set for the super-resolution processing, that is to say, according to the present invention, since the low-resolution image set that has sub-pixel displacements being necessary for the super-resolution processing is sufficiently obtained, it is possible to generate the high-resolution image with high image quality.

Moreover, it is possible to apply the image processing apparatus according to the present invention to electronic imaging devices (for example, digital imaging devices such as a single-chip solid-state color imaging device and a three-chip solid-state color imaging device) and image systems.

Further, the image processing apparatus according to the present invention can be implemented in software (computer program) and by using a computer system, and then the image processing apparatus according to the present invention can be also implemented in hardware such as an ASIC (Application Specific Integrated Circuit), a GPU (Graphics Processing Unit) and an FPGA (Field Programmable Gate Array).

Explanation Of Reference Numerals 100 image input unit
101 first storage unit
102 basis image selecting unit
103 reference image selecting unit
104 displacement amount computing unit
105 deformed image generating unit
106 image information selecting unit
107 parameter setting unit
108 composed image and weighted image generating unit
109 second storage unit
110 high-resolution grid image generating unit
111 simplified interpolation image generating unit
112 image characteristic amount computing unit
113 image characteristic amount display unit 114 external I/F control unit
115 reconstruction processing unit
116 high-resolution image output unit
200 composed image generating unit
201 weighted image generating unit
300 filling rate computing unit
301 high-frequency component computing unit
302 edge amount computing unit
303 color saturation computing unit
304 color difference computing unit
305 color specification converting unit
306 edge detecting unit

The invention claimed is:

1. An image processing apparatus for aiding that a user acquires an optimal low-resolution image set for a super-resolution processing in generating a high-resolution image by using a plurality of low-resolution images and by means of said super-resolution processing, comprising:
an image input unit for inputting said plurality of low-resolution images;
a basis image selecting unit for selecting a basis image from said plurality of low-resolution images that are inputted;
a reference image selecting unit for selecting a plurality of reference images to be used in said super-resolution processing from said plurality of low-resolution images that are inputted;
a displacement amount computing unit for computing a displacement amount for performing registration on a high-resolution image space between said basis image and said each reference image;
a deformed image generating unit for generating a plurality of deformed images based on said displacement amounts and said plurality of reference images;
a high-resolution grid image generating unit for generating high-resolution grid images based on said displacement amounts, said basis image and information about said reference images and said deformed images;
an image characteristic amount computing unit for computing image characteristic amounts due to filling state of image based on said high-resolution grid image; and
an image characteristic amount display unit for displaying said image characteristic amounts.

2. An image processing apparatus according to claim 1, wherein said image characteristic amount computing unit comprises a filling rate computing unit for computing a filling rate of said high-resolution grid image that represents a ratio of undefined pixels of said high-resolution grid image with respect to number of pixels on said high-resolution image space.

3. An image processing apparatus according to claim 2, wherein said image characteristic amount is a filling rate computed with respect to every small region obtained by region-dividing said high-resolution grid image.

4. An image processing apparatus according to claim 2, wherein said image characteristic amount is a ratio of small regions having a filling rate more than or equal to a given threshold with respect to total number of small regions obtained by region-dividing said high-resolution grid image.

5. An image processing apparatus according to claim 1, wherein said image characteristic amount computing unit comprises a high-frequency component computing unit for computing a high-frequency component with respect to said high-resolution grid image.

6. An image processing apparatus according to claim 5, wherein said image characteristic amount is a relative high-frequency component of said high-resolution grid image that represents a ratio of a high-frequency component of said high-resolution grid image to a high-frequency component of said basis image.

7. An image processing apparatus according to claim 1, wherein said image characteristic amount computing unit comprises an edge amount computing unit for computing an edge amount with respect to said high-resolution grid image.

8. An image processing apparatus according to claim 7, wherein said image characteristic amount is a relative edge amount of said high-resolution grid image that represents a ratio of an edge amount of said high-resolution grid image to an edge amount of said basis image.

9. An image processing apparatus according to claim 1, wherein said image characteristic amount computing unit comprises an interpolation processing unit for performing an interpolation processing of missing pixels with respect to said high-resolution grid image and generating an interpolation image.

10. An image processing apparatus according to claim 9, wherein said image characteristic amount computing unit comprises a color specification conversion processing unit for performing a color specification conversion processing with respect to said basis image and said interpolation image, and generating a color specification conversion basis image and a color specification conversion interpolation image.

11. An image processing apparatus according to claim 10, wherein said image characteristic amount computing unit comprises a high-frequency component computing unit for computing a high-frequency component with respect to said interpolation image or said color specification conversion interpolation image.

12. An image processing apparatus according to claim 11, wherein said image characteristic amount is a relative high-frequency component of said interpolation image that represents a ratio of a high-frequency component of said interpolation image to a high-frequency component of said basis image.

13. An image processing apparatus according to claim 11, wherein said image characteristic amount is a relative high-frequency component of said color specification conversion interpolation image that represents a ratio of a high-frequency component of said color specification conversion interpolation image to a high-frequency component of said color specification conversion basis image.

14. An image processing apparatus according to claim 10, wherein said image characteristic amount computing unit comprises an edge amount computing unit for computing an edge amount with respect to said interpolation image or said color specification conversion interpolation image.

15. An image processing apparatus according to claim 14, wherein said image characteristic amount is a relative edge amount of said interpolation image that represents a ratio of an edge amount of said interpolation image to an edge amount of said basis image.

16. An image processing apparatus according to claim 14, wherein said image characteristic amount is a relative edge amount of said color specification conversion interpolation image that represents a ratio of an edge amount of said color specification conversion interpolation image to an edge amount of said color specification conversion basis image.

17. An image processing apparatus according to claim 9, wherein said image characteristic amount computing unit comprises a color difference computing unit for computing color differences with respect to said basis image and said interpolation image.

18. An image processing apparatus according to claim 17, wherein said image characteristic amount is a relative color difference of said interpolation image that represents a ratio of a color difference of said interpolation image to a color difference of said basis image.

19. An image processing apparatus according to claim 10, wherein said image characteristic amount computing unit comprises a color difference computing unit for computing color differences with respect to said color specification conversion basis image and said color specification conversion interpolation image.

20. An image processing apparatus according to claim 19, wherein said image characteristic amount is a relative color difference of said color specification conversion interpolation image that represents a ratio of a color difference of said color specification conversion interpolation image to a color difference of said color specification conversion basis image.

21. An image processing apparatus according to claim 9, wherein said image characteristic amount computing unit comprises a color saturation computing unit for computing color saturations with respect to said basis image and said interpolation image.

22. An image processing apparatus according to claim 21, wherein said image characteristic amount is a relative color saturation of said interpolation image that represents a ratio of a color saturation of said interpolation image to a color saturation of said basis image.

23. An image processing apparatus according to claim 10, wherein said image characteristic amount computing unit comprises a color saturation computing unit for computing color saturations with respect to said color specification conversion basis image and said color specification conversion interpolation image.

24. An image processing apparatus according to claim 23, wherein said image characteristic amount is a relative color saturation of said color specification conversion interpolation image that represents a ratio of a color saturation of said color specification conversion interpolation image to a color saturation of said color specification conversion basis image.

25. An image processing apparatus according to claim 1, wherein said image characteristic amount is each similarity between said plurality of deformed images and said basis image.

26. An image processing apparatus according to claim 25, wherein said image characteristic amount is a similarity between said basis image and each deformed image of every small region obtained by region-dividing said plurality of deformed images and said basis image.

27. An image processing apparatus according to claim 25, wherein said image characteristic amount is a ratio of small regions having a similarity more than or equal to a given threshold with respect to total number of small regions obtained by region-dividing said deformed image.

28. An image processing apparatus according to claim 1, wherein said image characteristic amount display unit displays a transition of said image characteristic amount.

29. An image processing apparatus according to claim 1, wherein said image processing apparatus further comprises:
 a parameter setting unit for setting a threshold of a parameter becoming a basis for selecting image information of said reference image; and
 an external I/F control unit for making a change in said threshold of said parameter of said parameter setting unit in accordance with said user's visual recognition result of said image characteristic amount displayed in said image characteristic amount display unit.

30. An image processing apparatus according to claim 1, wherein said image processing apparatus further comprises an external I/F control unit for making a change in number of said plurality of reference images in accordance with said user's visual recognition result of said image characteristic amount displayed in said image characteristic amount display unit.

31. An image processing apparatus according to claim 1, wherein said image processing apparatus further comprises an external I/F control unit for making a change in number of said plurality of low-resolution images that are inputted into said image input unit in accordance with said user's visual recognition result of said image characteristic amount displayed in said image characteristic amount display unit.

32. An image processing apparatus according to claim 1, wherein said image processing apparatus further comprises an external I/F control unit for performing selection of said reference images in accordance with said user's visual recognition result of said image characteristic amount displayed in said image characteristic amount display unit.

* * * * *